(12) United States Patent
Florek et al.

(10) Patent No.: US 7,319,519 B2
(45) Date of Patent: Jan. 15, 2008

(54) METHOD FOR THE ANALYSIS OF ECHELLE SPECTRA

(75) Inventors: Stefan Florek, Berlin (DE); Michael Okruss, Potsdam (DE); Helmut Becker-Ross, Berlin (DE)

(73) Assignees: Gesellschaft zur Förderung angewandter Optik, Optoelektronik, Quantenelektronik und Spektroskopie e.V., Berlin (DE); Gesellschaft zur Förderung der Analytischen Wissenschaften e.V., Dortmund (DE)

(*) Notice: Subject to any disclaimer, the term of this patent is extended or adjusted under 35 U.S.C. 154(b) by 436 days.

(21) Appl. No.: 10/416,566

(22) PCT Filed: Nov. 3, 2001

(86) PCT No.: PCT/EP01/12750

§ 371 (c)(1),
(2), (4) Date: Oct. 3, 2003

(87) PCT Pub. No.: WO02/39077

PCT Pub. Date: May 16, 2002

(65) Prior Publication Data

US 2004/0114139 A1    Jun. 17, 2004

(30) Foreign Application Priority Data

Nov. 13, 2000  (DE) ................................ 100 55 905

(51) Int. Cl.
*G01J 3/28* (2006.01)
(52) U.S. Cl. ...................................... 356/328
(58) Field of Classification Search ................ 356/328, 356/334, 326
See application file for complete search history.

(56) References Cited

U.S. PATENT DOCUMENTS 3,658,424 A    4/1972   Elliott (Continued)

FOREIGN PATENT DOCUMENTS

DE            256060         4/1988

(Continued)

OTHER PUBLICATIONS

ISR for PCT/EP 01/12750 dtd May 15, 2002.

(Continued)

*Primary Examiner*—Gregory J. Toatley, Jr.
*Assistant Examiner*—Jonathan Skovholt
(74) *Attorney, Agent, or Firm*—James Creighton Wray; Clifford D. Hyra

(57) ABSTRACT

A method for the wavelength calibration of echelle spectra, in which the wavelengths are distributed across number of orders is characterised by the steps: recording of a line-rich reference spectrum with known wavelengths for a number of the lines, determination of the position of a number of peaks of the reference spectrum in the recorded spectrum, selection of at least two first lines of known order, position and wavelength, determination of a wavelength scale for the order in which the known lines lie, by means of a fit function $\gamma_m(x)$, determination of a provisional wavelength scale $\gamma?m 1_¿(x)$ for at least one neighboring order m 1, by means of addition/subtraction of a wavelength difference $\gamma_{FSR}$ which corresponds to a free spectral region, according to $\gamma_¿m 1?(x)=\gamma_m(x)\gamma_{FSR}$ with $\gamma_{FSR=\gamma}\iota_m(x)/m$, determination of the wavelengths of lines in said neighboring order m 1, by means of the provisional wavelength scale $\gamma\ 1(x)$, replacement of the provisional wavelength of at least two lines by the reference wavelength for said lines as obtained in step (a) and repeat of steps (d) to (g) for at least one further neighboring order.

25 Claims, 14 Drawing Sheets

U.S. PATENT DOCUMENTS

| | | | |
|---|---|---|---|
| 4,856,898 A * | 8/1989 | Becker-Ross et al. ...... | 356/328 |
| 4,930,892 A * | 6/1990 | Hadbawnik et al. ........ | 356/328 |
| 5,473,427 A * | 12/1995 | Riley et al. ................ | 356/328 |
| 5,739,905 A | 4/1998 | Hutchinson | |
| 6,529,531 B1 * | 3/2003 | Everage et al. ............... | 372/20 |

FOREIGN PATENT DOCUMENTS

| | | |
|---|---|---|
| DE | 3806519 | 11/1988 |
| DE | 4413096 | 10/1995 |
| EP | 445934 | 9/1991 |

OTHER PUBLICATIONS

Anon.; *Simultan Spektrometer: Diodenzeiten-Spektrometer in Modularsystem*; ZEISS, West Germany (Company Broschure) Undated.

Pelletier, M.J.; *Raman Spectroscopy Using an Echelle Spectrograph with CCD Detection*; Applied Spectroscopy; Dec. 1990; vol. 44, No. 10; pp. 1699-1705.

* cited by examiner

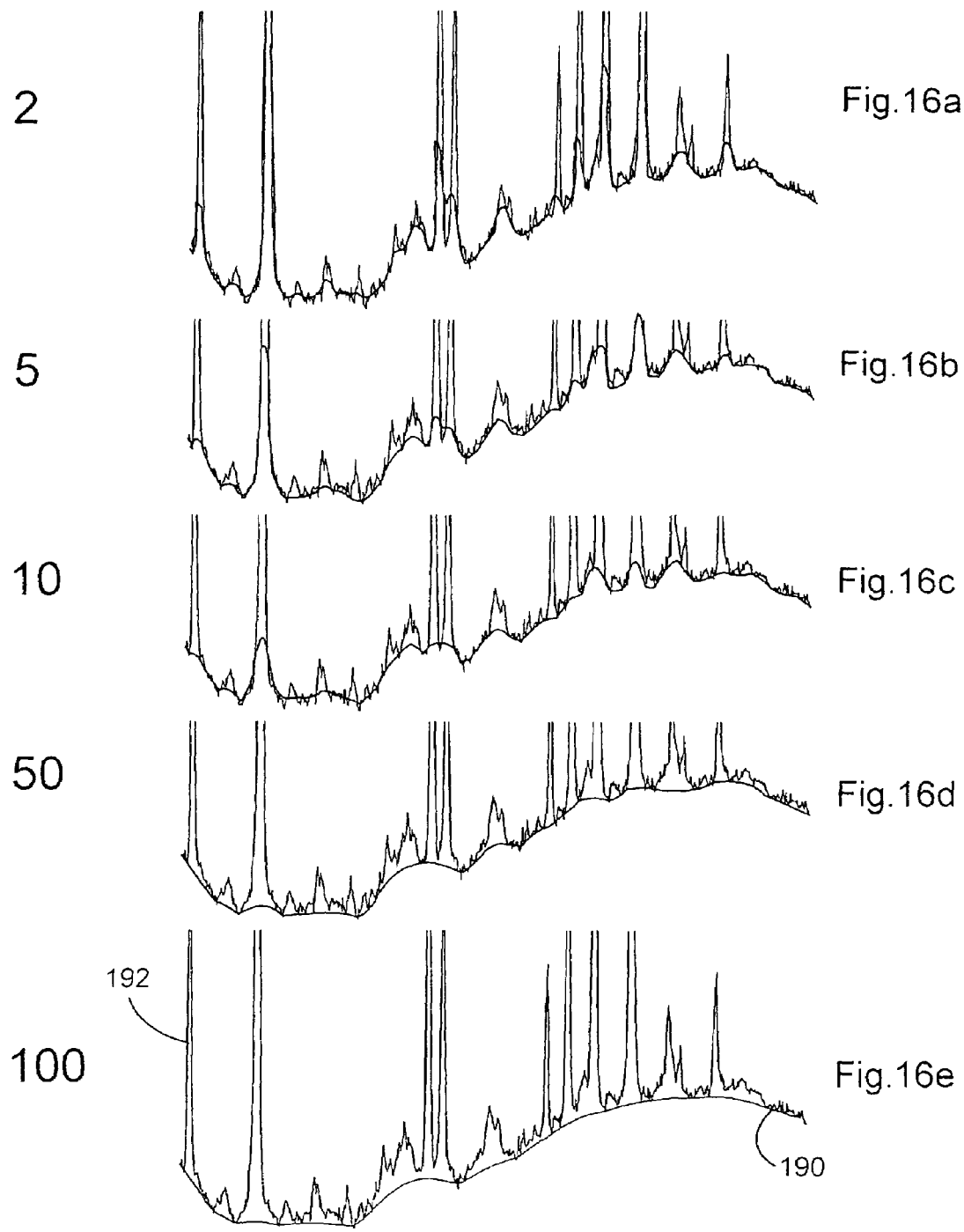

METHOD FOR THE ANALYSIS OF ECHELLE SPECTRA

This application claims the benefit of German Application No. 100 55 905.0 filed Nov. 13, 2000 and PCT/EP01/12750 filed Nov. 3, 2001.

TECHNICAL FIELD

The invention relates to an echelle spectrometer with manipulating means for manipulating the position of the optical components of the echelle spectrometer to cause a change of the position of the spectral lines in the exit plane. Furthermore, the invention relates to a method for compensation of shifts of echelle spectra in the exit plane of an echelle spectrometer.

The invention also relates to an echelle spectrometer with an echelle grating and a further dispersive element for separation of the orders of the echelle spectrum laterally to the dispersion direction of the echelle grating and a plane detector with a plurality of detector elements in the exit plane of the spectrometer for detecting the two dimensional echelle spectrum and a method for determining binning ranges of a two dimensional plane detector for two dimensional echelle spectra in the exit plane of an echelle spectrometer.

The invention also relates to an echelle spectrometer with an echelle grating and a further dispersive element for separation of the orders of the echelle spectrum laterally to the dispersion direction of the echelle grating and a plane detector with a plurality of detector elements in the exit plane of the spectrometer for detecting the two dimensional echelle spectrum and a method for wavelength calibration of echelle spectra, wherein the wavelengths are distributed on a plurality of orders.

STATE OF THE ART

It is known to generate high resolution spectra by means of echelle spectrometers, wherein the wavelength scale is distributed on a plurality of orders. The orders are separated perpendicular to the dispersion direction of the echelle grating (main dispersion direction) by means of a further dispersing element. Examples of such arrangements are described in the article "Adaption of an echelle spectrograph to a large CCD detector" by S. Florek, H. Becker-Roß, T. Florek in Fresenius J. Anal. Chem. (1996) 355, pages 269-271. Here an echelle grating is used, where the interesting wavelengths of the UV/VIS-range are in about the $80^{th}$ order.

With such spectrometers a small spectral range is selected from the spectrum of a spectrometer with low resolution by means of an exit slit and detected with a linear diode array or the like. By the pointwise recording of the spectra one is either limited to a certain number of points or spectral ranges detected with the respective detectors, or the spectrum is shifted turning the grating and/or prism towards the detector.

More recent spectrometers are equipped with two dimensional plane detectors. They enable the simultanious recording of the entire spectrum or at least large areas thereof. With the use of such two dimensional plane detectors it is important to know an unambiguous relationship between the wavelength and the respective pixel position and to possibly detect the entire light of one wavelength in the spectrum. This relationship is disturbed by changes of the spectrometer due to temperature changes, vibrations or the like. Furthermore the light of one wavelength is distributed on several pixels, the intensity values of which have to be added up to obtain a spectrum with a good signal-to-noise ratio. It has to be considered, that the orders are not exactly linear, but slightly curved, not parallel and not with equal distance on the detector.

The determination of the so called binning ranges for the determination of the intensity values for each respective spectral line can be achieved not only by determining the height of the image of the slit in the lateral dispersion direction but must also consider the curvature of the orders. This particularly depends from the spectrometer geometry and the properties of the optical components and can be determined only with great efforts by exact calculation of the geometric extension of the beam. Furthermore, the calculated determination of the curvature of the orders does not take into account drifts or other changes of the line positions in the exit plane due to environmental influences.

The calibration of the spectrum with an absolute relationship between the wavelengths and the intensity values is also very time consuming if carried out manually, as the interesting wavelengths are distributed on a plurality of orders and therefore an exact relationship between the wavelength and a pixel is not always available.

From the DD 260 326 it is known to arrange the optical components of an echelle spectrometer in such a way, that a secondary adjustment during the set up of the arrangement is possible. This adjustment serves to correct tolerances usually occurring at the manufacturing of the optical components. The components therefore can be manufactured with larger tolerances reducing the costs thereof. A regular compensation of drift or the like is not provided, as it would require much time.

The devices according to the known art are normally used in air conditioned laboratories, where drifts due to temperature shifts are generally small or a passive compensation of the drift by for example a thermostate was used. The use of spectrometers outside such laboratories therefore is either impossible or it requires considerable steps to achieve the stabilizing.

DISCLOSURE OF THE INVENTION

It is the object of the invention to provide an echelle spectrometer, which in a simple way enables an unambiguous and highly precise relationship between the intensity in each point of the exit plane and a wavelength. Furthermore it is an object of the invention to provide a method, by which this relationship can be determined.

It is a particular object of the invention to provide an echelle spectrometer and a method, with which the drift of spectral lines in the exit plane can be easily compensated for.

It is yet another object of the invention to provide an echelle spectrometer and a method with which such ranges in the exit plane can be determined, whereon light with the same wavelength can be detected (binning ranges).

It is a further object of the invention to provide an echelle spectrometer and a method, with which the unambiguous relationship between the wavelengths and each point in the exit plane can be determined in a simple and automatized manner.

Further objects of the invention will become clear from the description of the embodiments.

According to the invention this object is achieved by manipulating means that are movable according to a relationship between a defined combination of values for manipulating variables and the change of the position of the spectral lines. The relationship can be stored in the form of data sets, which allocate a plurality of possible positions to which a spectral line can drift, to each reference position of the spectral line in the exit plane. For each of such possible positions a combination of manipulating variables can be determined and allocated. This must be carried out only once. As long as the optical components are not exchanged this relationship can be used once it is determined. Each optical component to which a manipulating direction is allocated is moved by the respective manipulating variable such that the radiation in the exit plane moves to its desired position. The relationship can also have the form of a function.

The spectrometer can comprise a two dimensional plane detector, for example a Charge-Coupled-Device (CCD-) detector with a plurality of cartesian arranged picture elements (pixels) in the exit plane. However, it is also possible to position small linear detectors at a few interesting positions in the exit plane.

The position and the size of the picture elements is preferably adapted to the slit size of the entrance slit arrangement. The picture elements then have the same size as the image of the slit, whereby the entire image of the slit of monochromatic light can be detected by one picture element. It is also possible to chose picture elements or slit sizes in such a way that the size of the image of a slit for one wavelength is a multiple of the size of the picture elements.

The manipulating means can be provided on those optical components, which cause the largest possible shift of the position of a spectral line in the exit plane. It is not necessary to know the cause for the shift of the spectral lines from their reference position. On the contrary, knowing the effects caused by movement of an optical component such component can be selected, which causes the greatest effect. In this case the component must be moved only a little.

The manipulating means preferably are computer controlled. The advantage of this is that a manual manipulation of the device is not necessary. Manual manipulations can cause touching of optical components and contamination or misalignment thereof. Furthermore such manual manipulation is time consuming and relatively inaccurate.

The manipulating means for adjusting the manipulating variables can be formed by a piezoelectric element connected to a controlled voltage supply. These piezoelectric elements have a length depending on the supplied voltage. The change thereof can be very well adjusted via the supplied voltage. The absolute values of the lengths generally vary very much, but this does not cause any problem by the present method because the actual position of the spectral line is compared to its reference position and therefore provides a feedback which makes it possible to determine the required change of the length of the piezoelectric element from one measurement to the next.

In a preferred embodiment of the invention one of the manipulating variables is the angle of incidence on the echelle grating. Thereby the echelle dispersion, i.e. the distance between two lines in one order can be adjusted. The manipulating means for adjusting the angle of incidence on the echelle grating can be a fine spindle driven by a stepping motor instead of a piezoelectric element.

One of the manipulating variables can be the incident angle on a prism for separation of the orders of the echelle spectrum perpendicular to the dispersion direction of the echelle grating by the so called lateral dispersion. Instead of the relative shift between the lines within the spectrum in the direction of the lateral dispersion by the controlled adjustment of a prism a passive adjustment can be used. The prism is connected to a compensator. The compensator expands or shrinks with temperature changes in such a way that is causes a rotation of the prism compensating the changes of the prism dispersion due to temperature changes. It has been surprisingly found that the main portion of the shifts within the spectrum in the direction of the lateral dispersion is caused by changes of the prism. Therefore almost the entire shift can be compensated by the passive compensation of one single optical element and no further manipulating means are needed for this direction.

In a preferred embodiment the compensator comprises:
(a) a brass cylinder,
(b) an invar hollow cylinder for coaxially receiving the brass cylinder,
(c) a first metal block firmly connected to the invar hollow cylinder the brass cylinder extending through the invar hollow cylinder and the metal block and projecting therefrom, and
(d) a second metal block connected to the prism and connected to the first metal block via a bending element in such a way that the brass cylinder generates a pressure on the second metal block which depends on the temperature.

This way of passive compensation is simple and causes a good stability of the line distances in the direction of the lateral dispersion.

In a particularly preferred embodiment of the invention one of the manipulating variables is the horizontal orientation of a camera mirror arranged in the echelle spectrometer. By turning the camera mirror about a horizontal axis, which does not necessarily need to extend through the vertex of the mirror, the vertical shift of the spectral image can be generated in the exit plane which does not change in a good approximation. A further manipulating variable can be the vertical orientation of a camera mirror arranged in the echelle spectrometer. The corresponding movement causes a horizontal shift of the spectral image.

One of the manipulating variables can be the rotational angle of the detector about a rotational axis running essentially perpendicular to the detector surface. Thereby rotations of the entire spectral image in the exit plane or rotations of the detector can be compensated. The rotation is preferably effected by fixing the detector on a first fixing element connected to a second fixing element via a bending element and by generating pressure to the corresponding fixing element by a piezoelectric element provided on one of the fixing elements in such a way that the detector is rotated by a selected angle.

Preferably there are memory means provided for the storage of the relationship. In this case the relationship can be stored in the form of values for possible position shifts of spectral lines and in form of the corresponding manipulating values for each of the provided manipulating variables for shifting the spectral line from the measured position to the reference position. The relationship can also be stored in the form of functions or graphs.

The object is achieved particularly by a method for compensation of shifts of an echelle spectrum in the exit plane of an echelle spectrometer characterized by the steps: (a) determining the position of selected spectral lines, (b) comparing the such determined position of the spectral lines with a given reference position, (c) determining a combination of manipulating values for the manipulating means according to a relationship allocating a defined combination of manipulating values to each change of position, and (d) activating the manipulating means according to the so obtained combination of manipulating values. By measuring a combination of the manipulating variables for shifting a spectral line from its actual position in the exit plane to a reference position the cause of the shift does not need to be determined. The correction can be carried out immediately according to the previously known specification. Accordingly, a plurality of shifts from the respective reference positions can be determined for a plurality of spectral lines and corrected with a combination of manipulating variables determined before. The specification of the relationship can be independent of the cause for possible position shifts.

In a preferred embodiment of the invention steps (a) to (d) are repeated until the position of the spectral lines are within a given tolerance of the reference position. If the combination of the manipulating variables does not achieve the goal directly with the first correction, which means, if the spectral lines are not shifted to its reference position with a sufficient accuracy, the correction can be repeated. It is assumed that a smaller shift is needed during the repetition if the combination of the manipulating variables is sufficiently optimized, so that the procedure is convergent and the spectral lines lay within a selected tolerance about the reference position after a number of repetitions. The amount of repetitions depends on the size of the tolerance range.

In an embodiment of the invention at least two spectral lines are selected in one order in step (a). Thereby environmental influences on the grating can be corrected. The distance of the spectral lines in one order is a measure for the actual grating dispersion. Alternatively two spectral lines in two relatively close orders can be selected.

In a simple embodiment of the invention the relationship takes changes of the position in the direction of the dispersion of the echelle grating into account but not in the direction of the lateral dispersion. In this case it is preferred to correct influences on the prism by a compensator. In a more accurate method at least two spectral lines are selected in one order in step (a) and at least one third spectral line in a different order. This different order should be as far away from the order with the two other spectral lines as possible. Thereby also rotations of the spectrum and shifts or distortions in the direction of the lateral dispersion can be corrected. The third spectral line is preferably positioned in an order which is located at least 5 orders from the order of the other selected spectral lines. Instead of two spectral lines in one order two spectral lines in relatively close neighbouring orders can be used also.

The object of the invention is also achieved by an echelle spectrometer with (a) illuminating means with light of a light source with a continuous wavelength spectrum, (b) means for the detection of detector elements on which the light of said light source with a continuous wavelength spectrum is a Minimum between the orders, (c) computer means for determining a function from the plurality of points on the detector. With such a spectrometer it is possible to find the binning ranges on which falls light of the same wavelength and to accumulate them by hardware or software. Thereby the signal-to-noise ratio of the spectra is improved and a "straight" spectrum is generated. The orders in a two dimensional spectrum in the exit plane of an echelle spectrometer are curved by the second dispersion which is necessary for the separation of the orders. With a continuous spectrum illuminating the spectrometer the orders are completely detectable. Thereby especially the minimum between two adjacent orders can be determined in each point in the exit plane which is not possible in this form with a line spectrum. The geometric shape of this minimum can be described by a function and enables the determination of the binning ranges.

The intensity measured with selectable, adjacent detector elements can be accumulated to one intensity value by hardware. However, it is also possible to add up the intensity values with a software.

The separation of the orders is preferably such that the intensity minima between the orders do not extend beyond more than two detector elements perpendicular to the orders. Thereby a high filling factor can be achieved, i.e. an optimal use of the detector surface. The amount of the picture elements not used for the detection of the spectrum is small. At the same time the minimum between the orders is sufficiently pronounced for the determination of the binning ranges. With a good filling factor the detector can be kept as small as possible, whereby the costs are reduced.

The object of the invention is also achieved by a method for determining binning ranges on a plane detector for two dimensional echelle spectra in the exit plane of an echelle spectrometer, characterized by the steps:

(a) For each column (x) determining the position $(x, y_{min,m})$ of the detector element where the intensity (I) of the light source with the continuous spectrum ($I(\lambda)$=constant) is a minimum ($I_{min=I(x,ymin,m)}$) between the orders (m and m−1), (b) Determining a function ($y_{min, m}(x)$) representing the shape of the intensity minimum ($I_{min}$) between two orders (m and m+1) as a function of the column number (x), (c) Repeating steps (a) and (b) for the shape ($y_{min, m-1}(x)$) of at least one intensity minimum between the next adjacent orders (m−1 and m), (d) Determining the binning ranges for one order (m) being the sum of all detector elements (x, y) for which:

$x$=constant and $y_{min, m-1}(x) < y < y_{min,m(x)}$.

By this method the binning ranges along at least one order can be determined in a simple way. A spectrum with "straight" orders is obtained.

Instead of the geometric shape of the minimum of the intensity also the geometric shape of the maximum of the intensity can be determined and the binning ranges can extend over a range where: x=constant and $|y|<y+|\Delta y_{m, m+1}/2|$, with $\Delta y_{m, m+1}$ denotes the distance between the maximum of the order m and the maximum of the order m+1. This is particularity suitable in those cases where the separation between the orders is large and no unambiguous minimum occurs.

The position of the detector element according to step (a) can be preferably determined by the following steps:

(a1) selecting of a detector column (x), (a2) illuminating the spectrometer with the light of a light source with a continuous spectrum (a3) determining the detector element in the selected column (x), whereon lays the intensity minimum of a selected order (m), (a4) determining the detector element in the next adjacent column (x+1), whereon lays the intensity minimum of three adjacent detector elements right next to the detector element determined in step (a3) and (a5) repeating step (a4) for all columns (x).

This method operates similarly to a rolling ball in a channel: starting from a starting value in a selected detector column and a selected order the next adjacent picture element with an intensity minimum is selected. The picture element considered for the selection are the next picture element in the direction of the column and the picture elements over and under it touching the starting value with a corner. The minima of such selected picture elements essentially correspond to the geometric shape of the minimum between two orders.

In an embodiment of the invention the function according to step (b) is formed by a fitting function $y_{min}=y(x)$ through the detector elements determined according to step (a). Thereby errors due to digitization and noise are corrected. The fitting function can be for example a polynomial function of second or third order.

Preferably the function is stored for each order; for the polynomial function for example in the form of the coefficients of the polynomial function for each order. In a particularly preferred embodiment of the invention a order dependent, secondary function is formed from the corresponding coefficients of the polynomial function of each order and this function is fitted by means of a fitting function. The functions describing the geometric shape of the orders do not abruptly change from one order to the next but continuously. By fitting this group of functions the accuracy with respect to errors due to digitization, noise and others can be further improved. The secondary fitting function again can be formed by a polynomial function. Then the polynomial coefficients of the secondary fitting function can be stored. Thereby the amount of data in the memory for the evaluation of the geometric shape of the orders can be further reduced.

In an embodiment of the invention the columns of the detector are arranged essentially perpendicular to the dispersion direction of the echelle grating. Instead of the detector columns, however, also the detector lines can be used, if the geometry is such, that the spectrum is rotated by about 90 degrees.

Preferably the detector column selected according to step (a1) is about in the middle of the spectrum. Then the function is determined on both sides of the column.

The binning ranges preferably proportionally consider the intensities of the detector elements of a column belonging to the same order, if the value of the fitting function is not an integral value in the middle of the detector element in the direction of the lines. Thereby a digitizing effect in the spectrum is avoided.

According to the invention the object is furthermore achieved by an echelle spectrometer with (a) illuminating means with light of a light source with a line spectrum, (b) means for identifying at least one spectral line of the line spectrum, (c) means for storing and displaying reference wavelengths for the line spectrum. Such an echelle spectrometer enables the unambiguous relationship between each point in the exit plane and a wavelength. Especially spectral light sources with many lines are particularly suitable, because the quality of the calibration is increased with the amount of lines.

The object of the invention is also achieved by a method for calibrating an echelle spectrometer wherein the wavelengths are distributed on a multiplicity of orders, characterized by the steps (a) detecting a reference spectrum having many lines with known wavelengths for a plurality of the lines, (b) determining the position of a plurality of peaks of the reference spectrum in the so detected spectrum, (c) selecting at least two first lines in a known order with a known position and wavelength, (d) determining of a wavelength scale for this order in which the known lines are positioned by a fitting function $\lambda_m(x)$, (e) determining a provisional wavelength scale $\lambda_{m+1}(x)$ for at least one adjacent order m±1 by adding/subtracting a wavelength difference $\Delta\lambda_{FSR}$ corresponding to the free spectral range according to $$\lambda_{m\pm 1}(x)=\lambda_m(x)\pm\Delta\lambda_{FSR}, \text{ with } \Delta\lambda_{FSR}=\lambda_m(x)/m$$

(f) determining the wavelength of lines in this adjacent order m±1 by means of the provisional wavelength $\lambda_{m\pm 1}(x)$, (g) replacing the provisional wavelength of at least two lines by the reference wavelength of these two lines according to step (a), (h) repeating steps (d) to (g) for at least one further neighbouring order.

It has been found that this method enables the automatization of the wavelength calibration. Surprisingly the provisional wavelength scale for the adjacent order according to step (e) is sufficient to identify reference lines and therewith determine a very precise wavelength scale. Thereby a very precise wavelength scale can be determined successively for each order from the such determined provisional wavelength scale. This precise wavelength scale again forms the basis for the calculation of a provisional wavelength scale of the next order and so on.

The reference spectrum can be formed from the line spectra of several reference light sources. Then there are more lines available for the calibration. The reference light source can be simultaneously coupled into the spectrometer. However, it is also possible to successively illuminate with the reference spectra of the reference light sources and add them up to one reference spectrum.

The reference spectrum can comprise for example the nobel gas lines of at least one Pen-Ray-lamp and/or a platinum-hollow cathode lamp. Such lamps have many lines in their spectrum. Depending on the range of the spectrum to be operated in different reference spectra can be used or the absorption lines of a continuous spectrum.

The reference spectrum can comprise the components of the sodium doublett at 583 nm, which can be used as the first lines in step (c). The sodium lines are very well known to most spectroscopists due to their color, intensity and distribution and can therefore be easily identified. However, different lines can be used as first lines, such as the Hg line at 253 nm.

Preferably a background correction with respect to broadband background is carried out before the calibration in step (b). This has the advantage that the relative intensities of the lines can be considered at the identification. In an embodiment of the invention the background correction comprises the following steps:

(a1) smoothing of the recorded spectral graph (a2) determining of all values in the initial graph having a value higher than the value of the smoothed graph and reducing such values to the value of the smoothed graph, (a3) repeating the steps (a1) to (a2) at least twice, (a4) subtracting the background graph obtained in such a way from the initial graph.

The peaks in the smoothed graph are usually flatter and broader. If the values laying higher than the smoothed graph are set to the value of the smoothed graph and this procedure is repeated several times the peaks will disappear after a while and only the broadband background remains which can be subtracted from the initial graph. The broadband background can originate from non-resolved rotational-vibrational-bands of molecules, from scattered light or other quasi-continuous and continuous light sources the height and width of the peaks superimposed on this background are not influenced by this way of correction.

The smoothing of the graph is preferably carried out by moving average. This is a method where each intensity value I at the position x in the spectrum is replaced by an average value $I_{mittel}$. The average value $I_{mittel}$ is calculated from the intensity values at the position x and the adjacent positions x±1, x±2, x±3 etc. Thereby the noise with a generally high frequency is smoothed and the peaks in a graph become flatter and broader. In an embodiment of the method the width of the moving average is twice as much of an average line width of a reference line.

The position of the peaks in the reference spectrum especially in step (b) can be determined by the steps
(b1) fixing a threshold value,
(b2) determining the maxima in the shape of the graphs above the threshold value,
(b3) selecting those maxima, where the adjacent pixels form peak flanks, which monotonously drop on both sides of the maximum to a given percentage of the maximum, and
(b4) determining the center of gravity of the peak as the position of those peaks the maxima of which have been selected according to (b3).

There are further peak finding procedures known which also can be used. However, it has been found that the method described here enables a full automatization of the method without great efforts if the thresholds and the other criteria are suitably selected. It is sufficient for the purpose of the calibration to find a certain amount of peaks without using peaks with a relatively low intensity.

The order, intensity, center of gravity, maximum and line width of the found peaks can be stored in a file. In this case the calibration can be used at any time.

Preferably the known first lines lay in the middle of the orders. The order of the known first lines can be determined from the diffraction grating parameter of the echelle grating. In an embodiment of the invention the lines with bad fitting parameters are not considered. The fitting function can be a polynominal function for example of second or third order. In this case the wavelength scale can be stored in the form of fitting parameters. However, it also can be stored in the form of data sets.

In a particularly preferred embodiment of the invention corresponding fitting parameters of each order are described by a secondary fitting function. This is based on the discovery that the wavelength scale does not change abruptly but continously. Accordingly the fitting parameters cannot change abruptly and can therefore be described by a secondary fitting function. The wavelength scale of the entire two dimensional echelle spectrum can be stored in the form of very few secondary fitting parameters. Alternatively the wavelength scale can be stored as a data set. This particularly suitable if only one certain wavelength shall be considered.

Further embodiments of the invention are subject matter of the subclaims. Preferred embodiments are described below in greater detail with reference to the accompanying drawing.

SHORT DESCRIPTION OF THE DRAWINGS

FIG. 1 schematically shows the arrangement of an echelle spectrometer with a prism in Littrow-arrangement.

Figure 4:
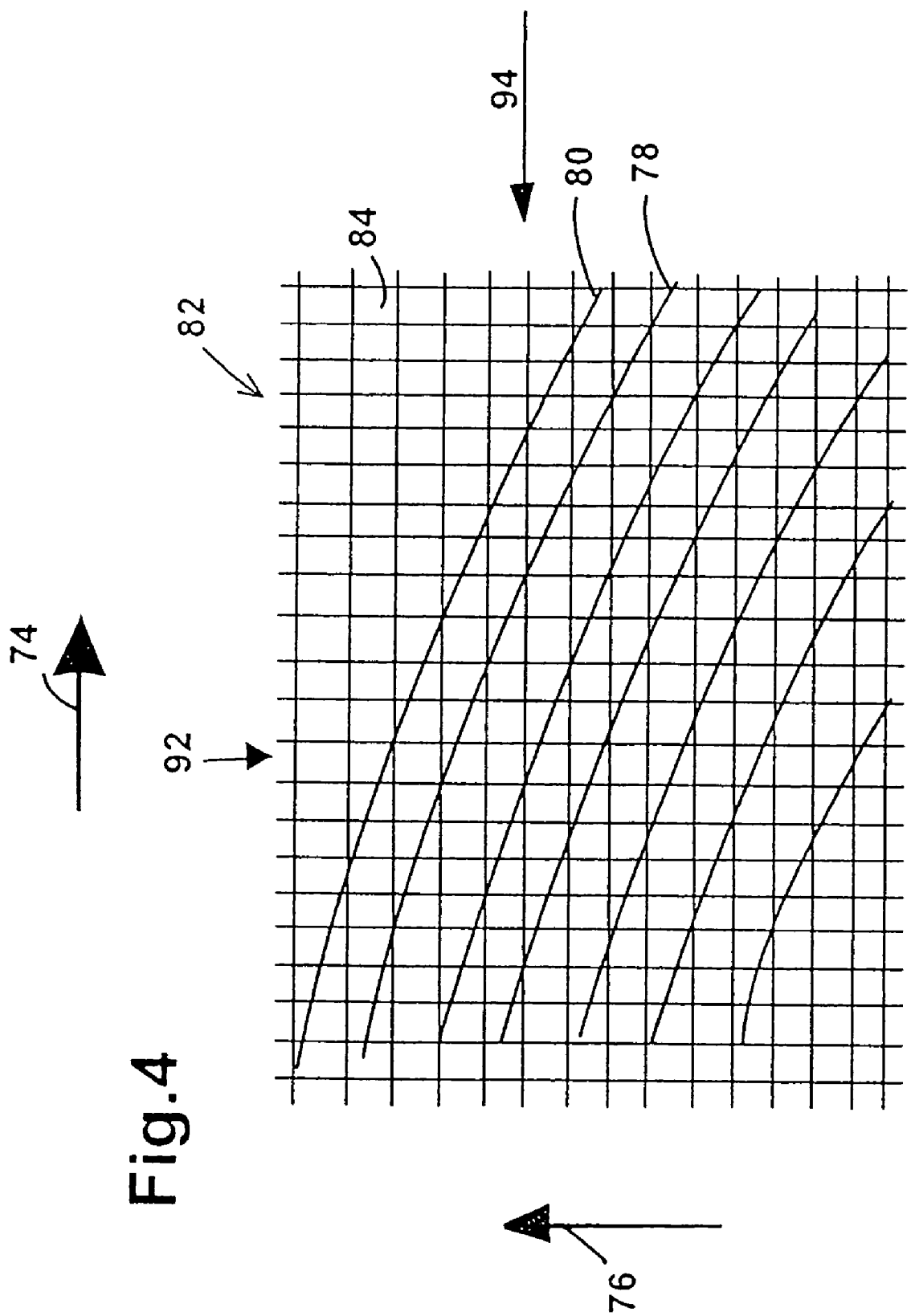

FIG. 4 schematically shows the orders of a continuous spectrum on a plane detector.

Figure 5:
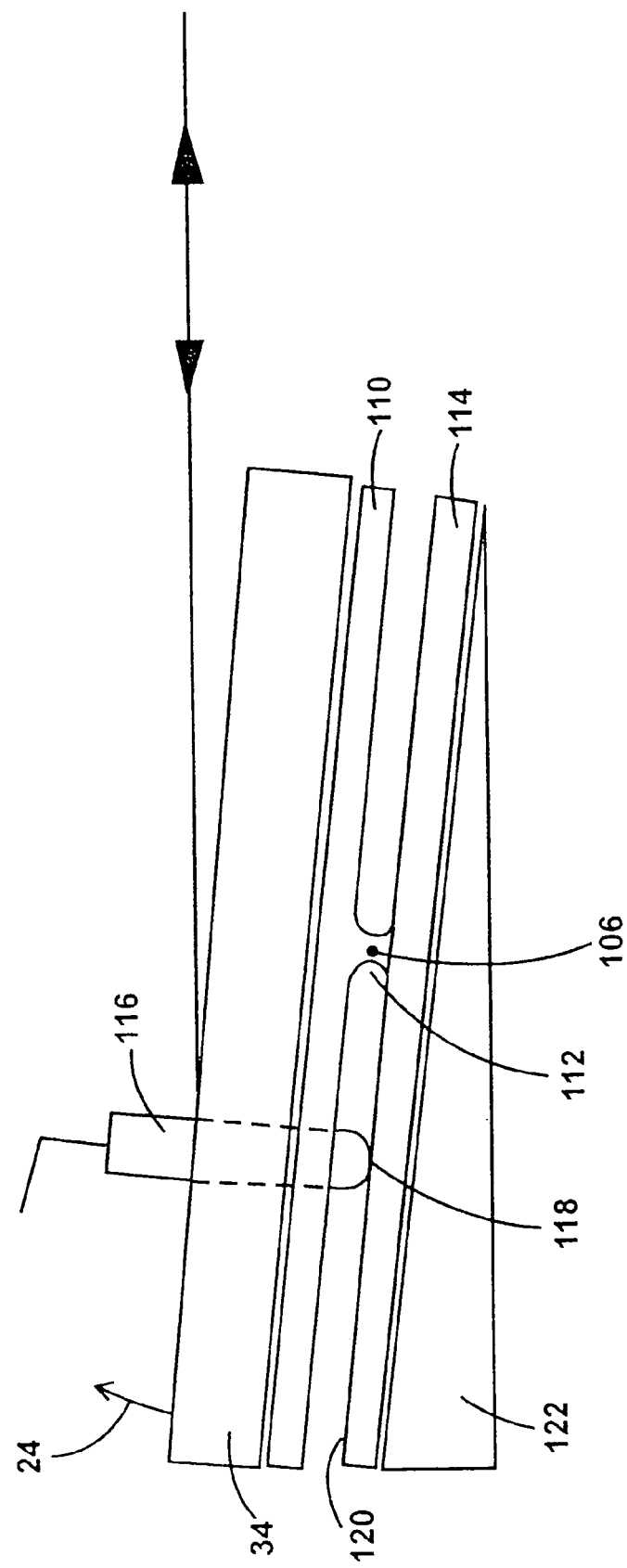

FIG. 5 is a detailed view of the grating arrangement.

Figure 6:
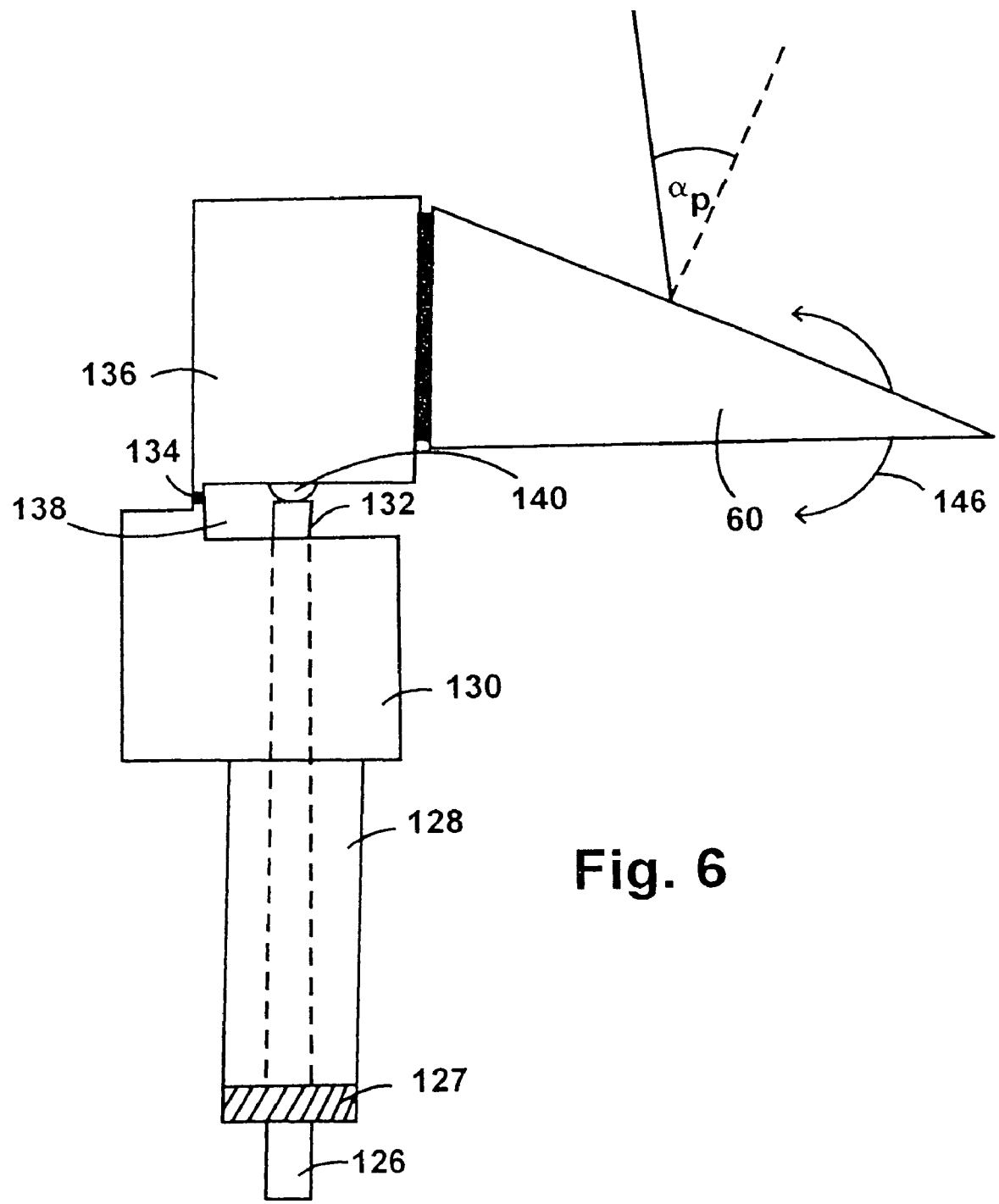

FIG. 6 is a detailed view of the arrangement of the prism with a compensator.

Figure 7:
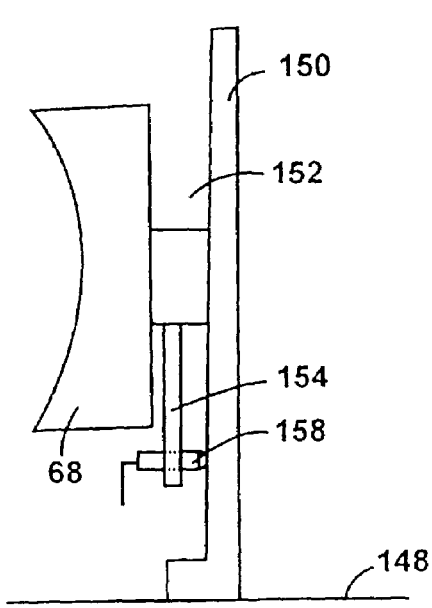

FIG. 7 is a detailed view of the camera mirror as a side view.

Figure 8:
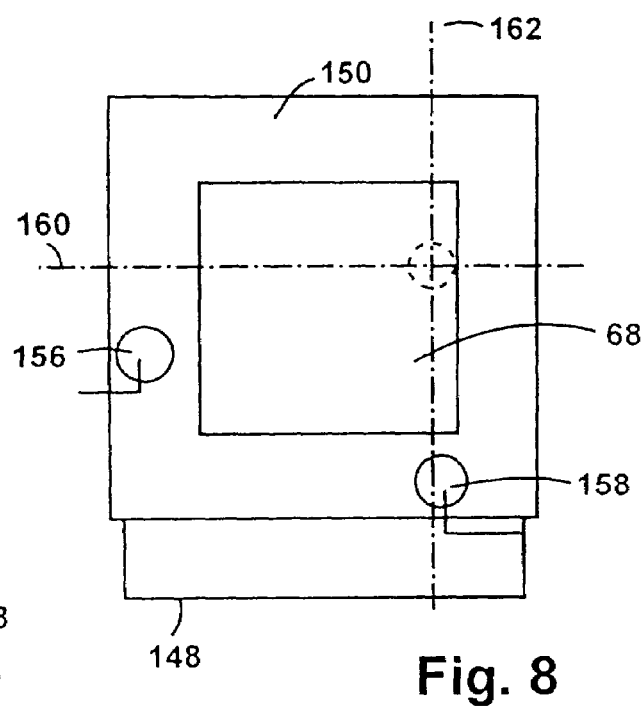

FIG. 8 is a detailed view of the camera mirror as a front view.

Figure 9:
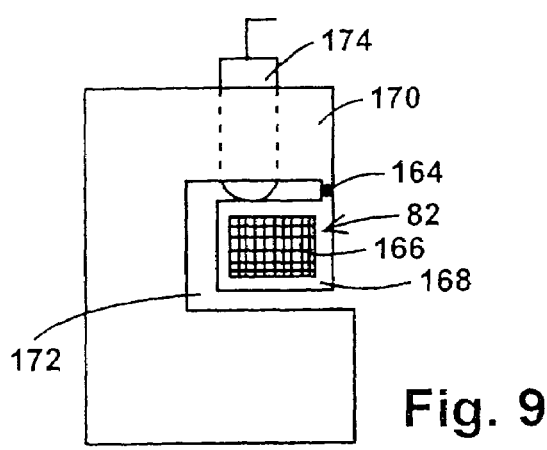

FIG. 9 is a detailed view of the detector arrangement as a front view.

Figure 10:
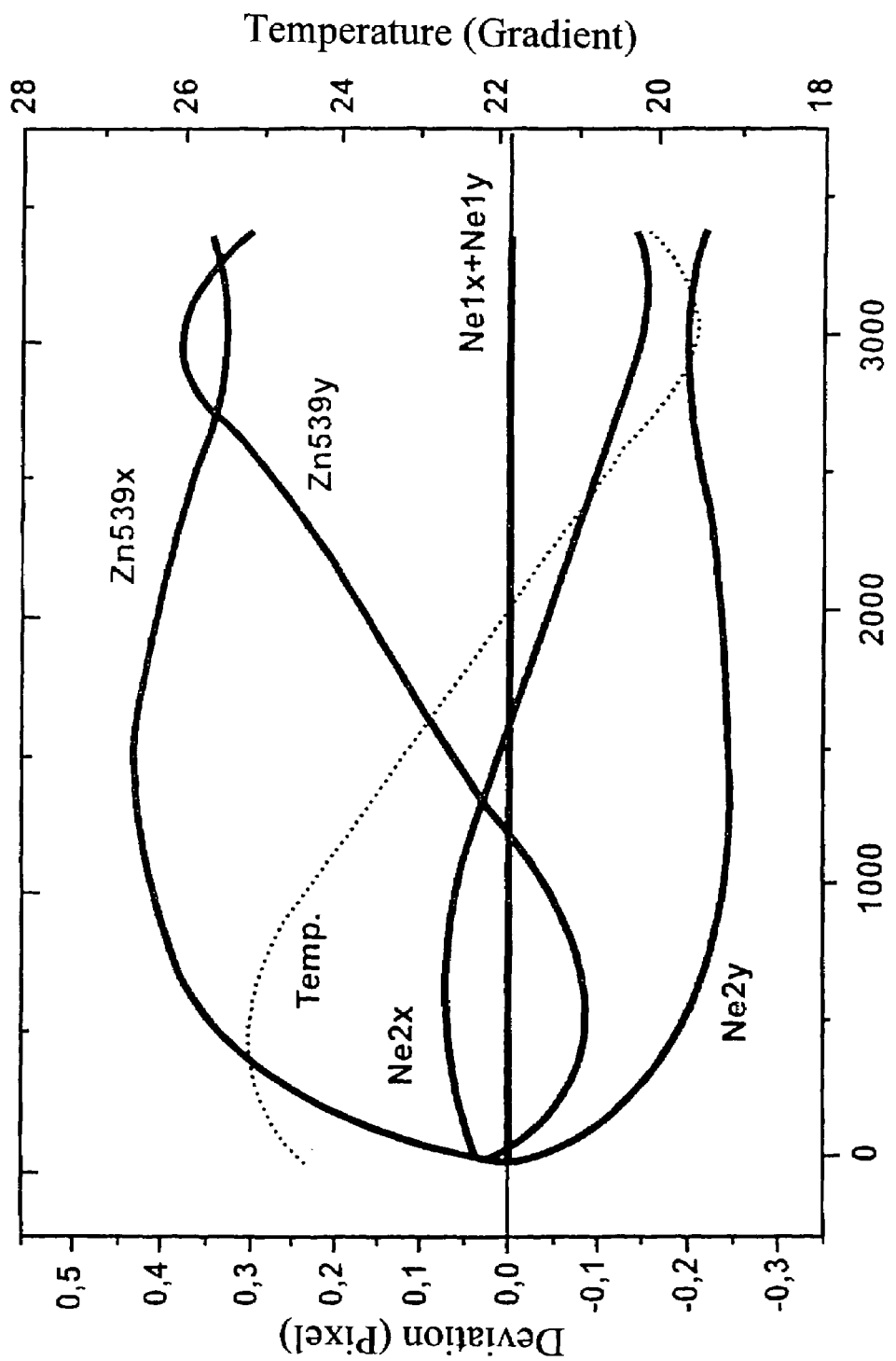

FIG. 10 is shows the position of the lines with changing temperature wherein the line is stabilized.

Figure 11:
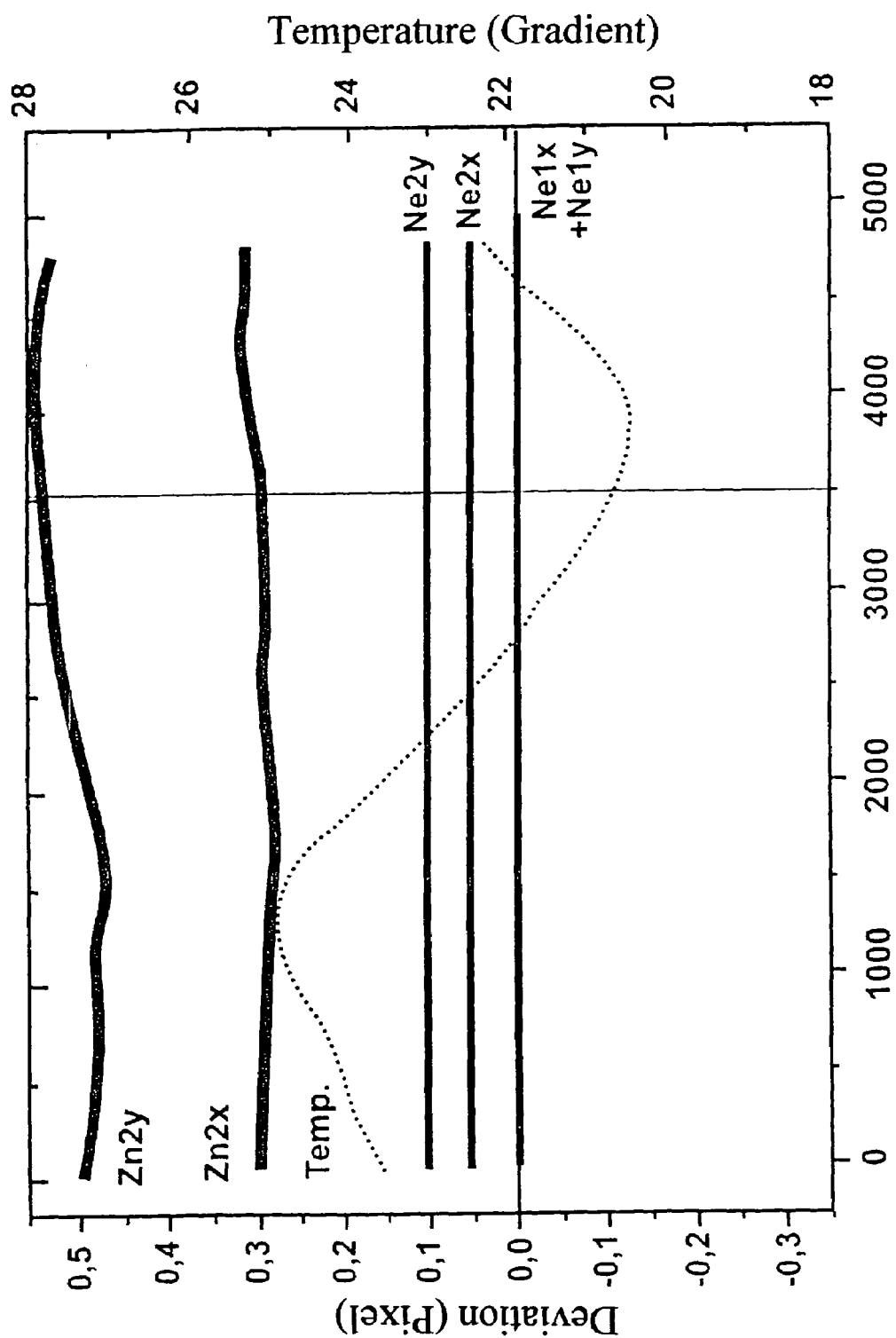

FIG. 11 is shows the position of the lines with changing temperature wherein all manipulating variables are stabilized.

Figure 12:
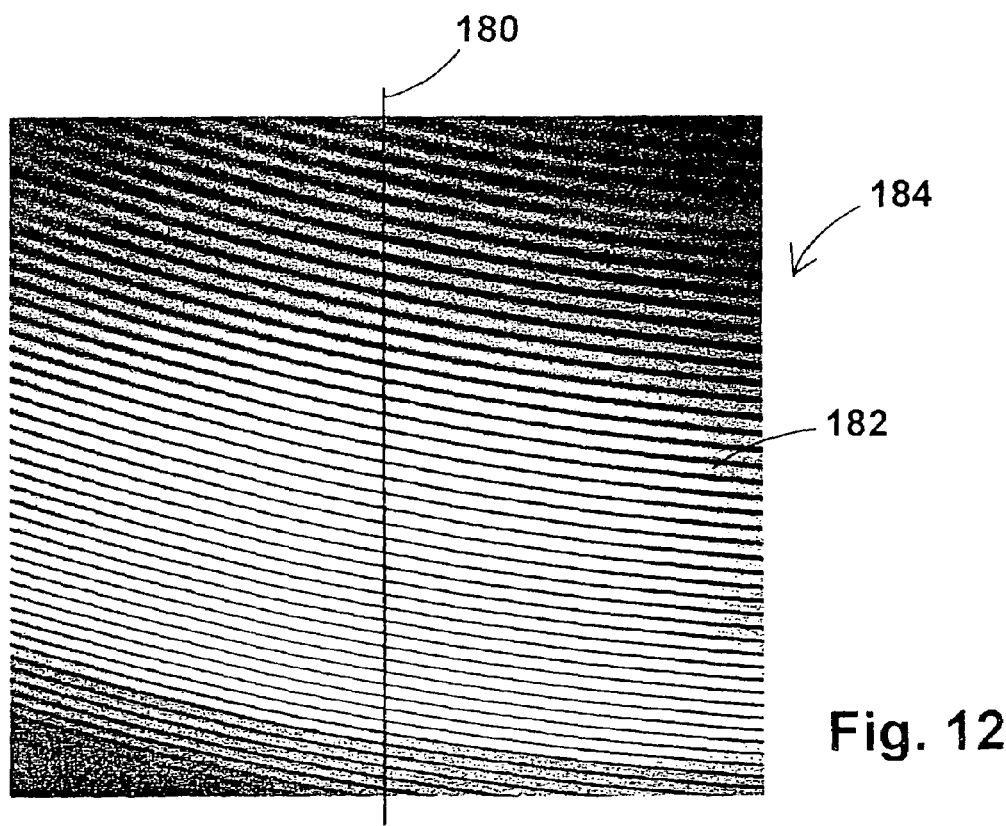

FIG. 12 shows the curved orders of a continuous spectrum and a selected column.

Figure 13:
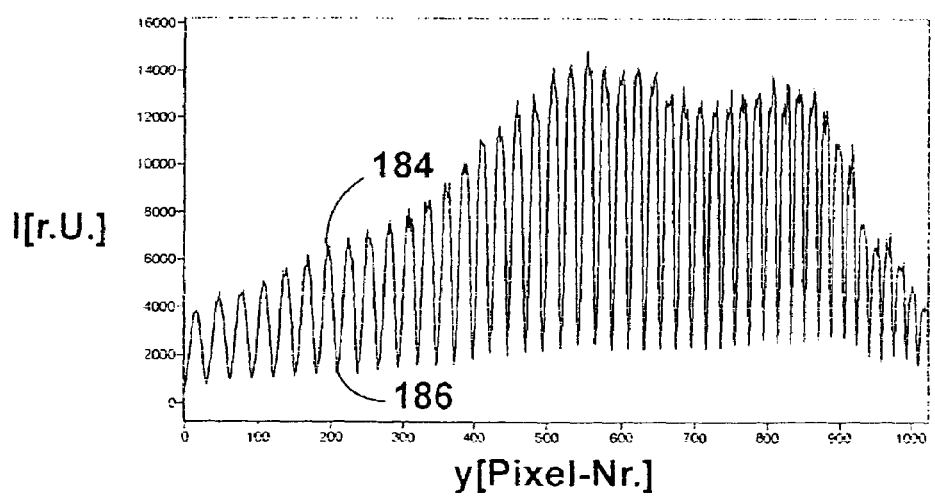

FIG. 13 shows the intensity along the selected column in FIG. 12.

Figure 14:
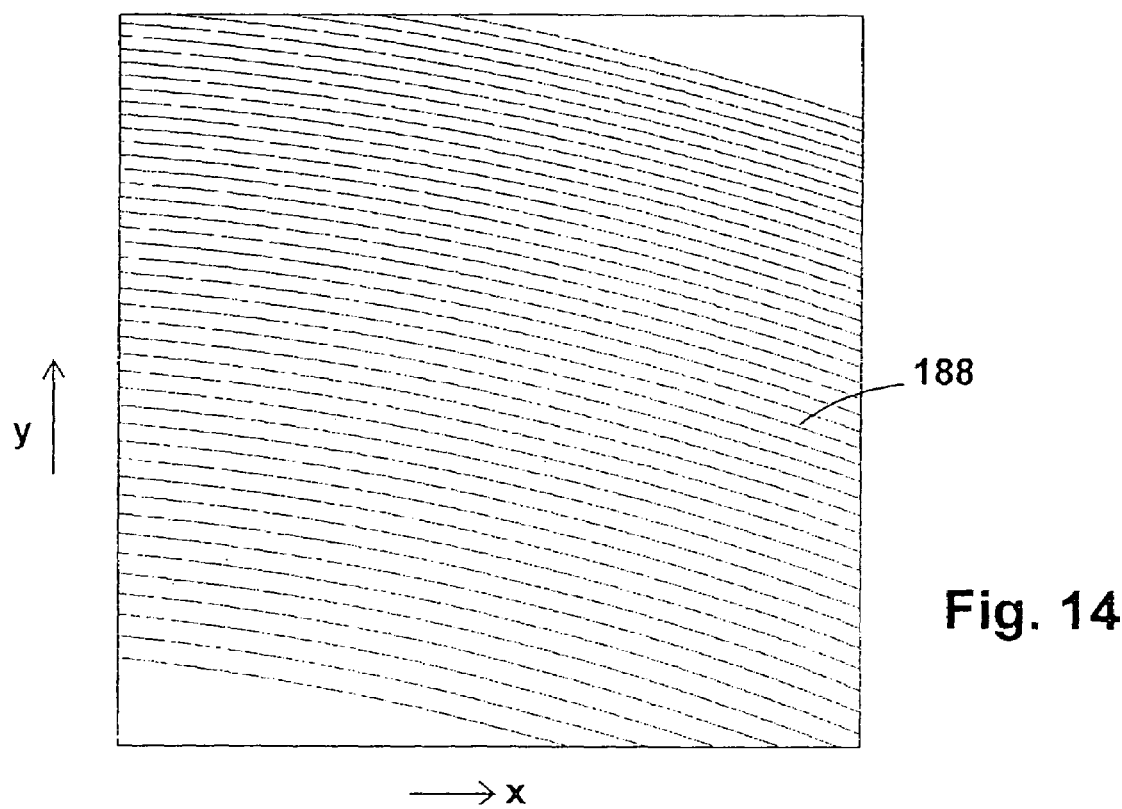

FIG. 14 shows the fitting function for the minima between the orders.

Figure 15:
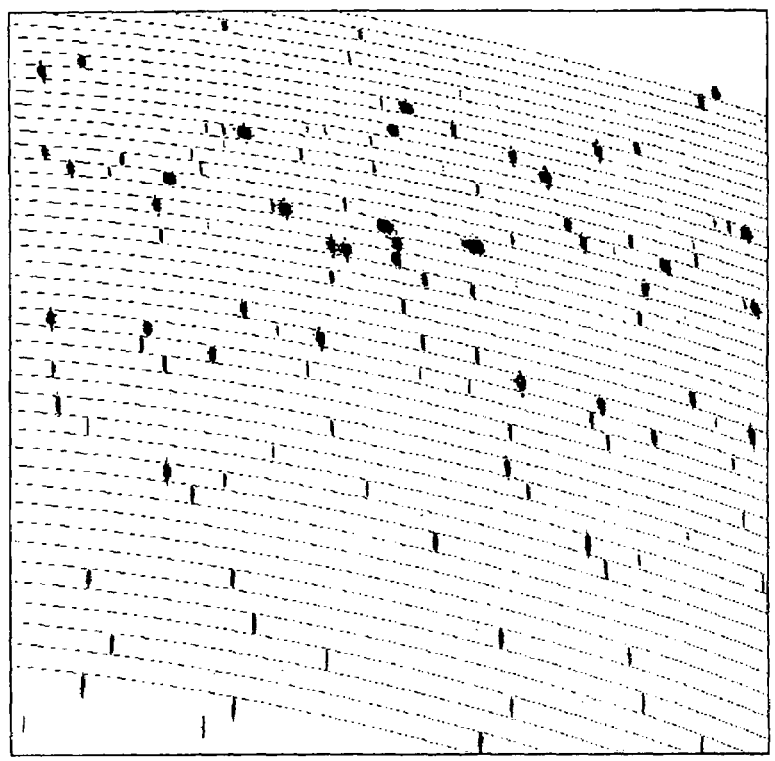

FIG. 15 shows the echelle spectrum of a line source.

FIG. 16(a)-(e) show the intensity along an order and the increasingly smoothed functions for carrying out the background correction.

Figure 17A:
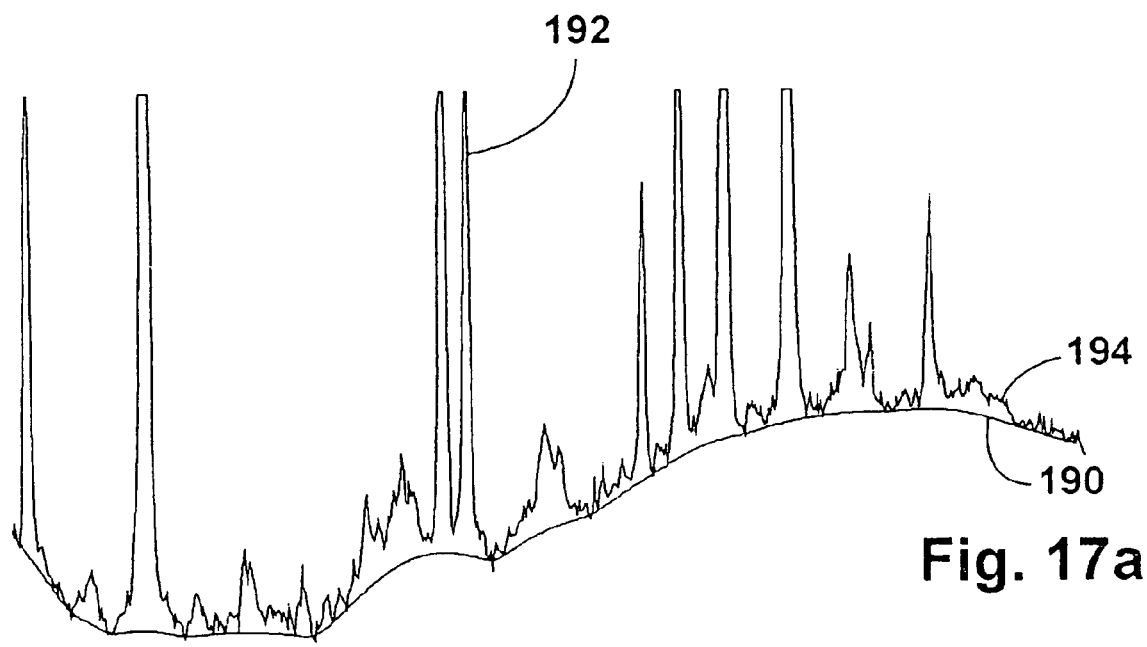

FIG. 17a shows the intensity along an order and the computed background.

Figure 17B:
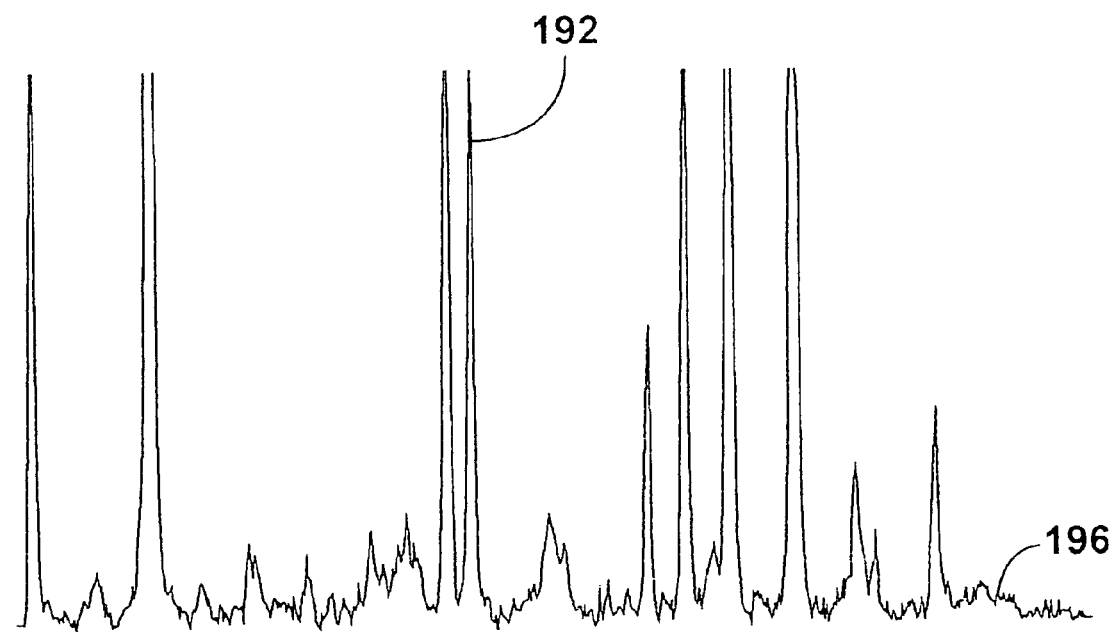

FIG. 17b shows the background corrected intensity along an order.

Figure 18:
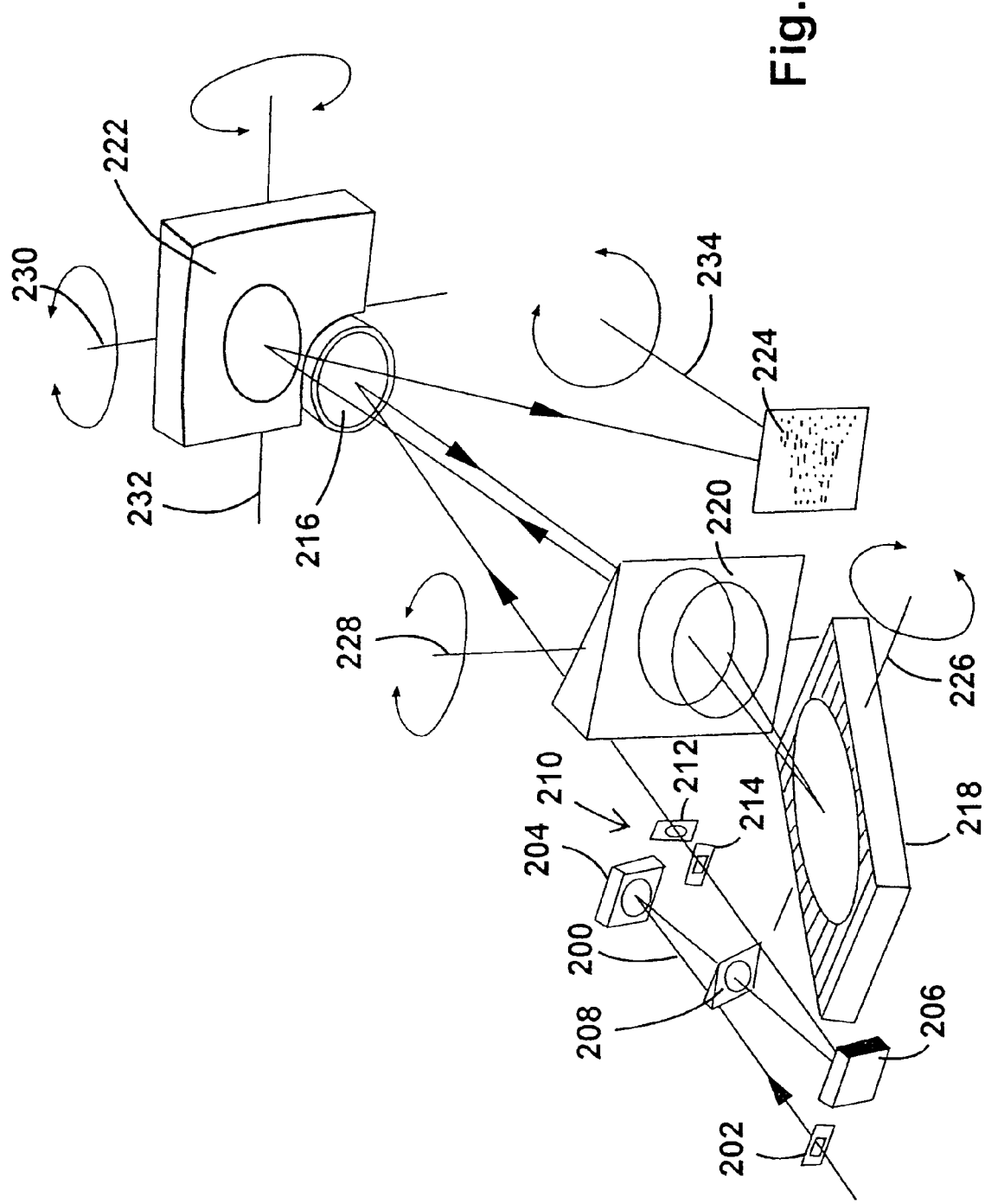

FIG. 18 shows an echelle spectrometer according to a different embodiment.

DESCRIPTION OF THE EMBODIMENTS

Figure 1:
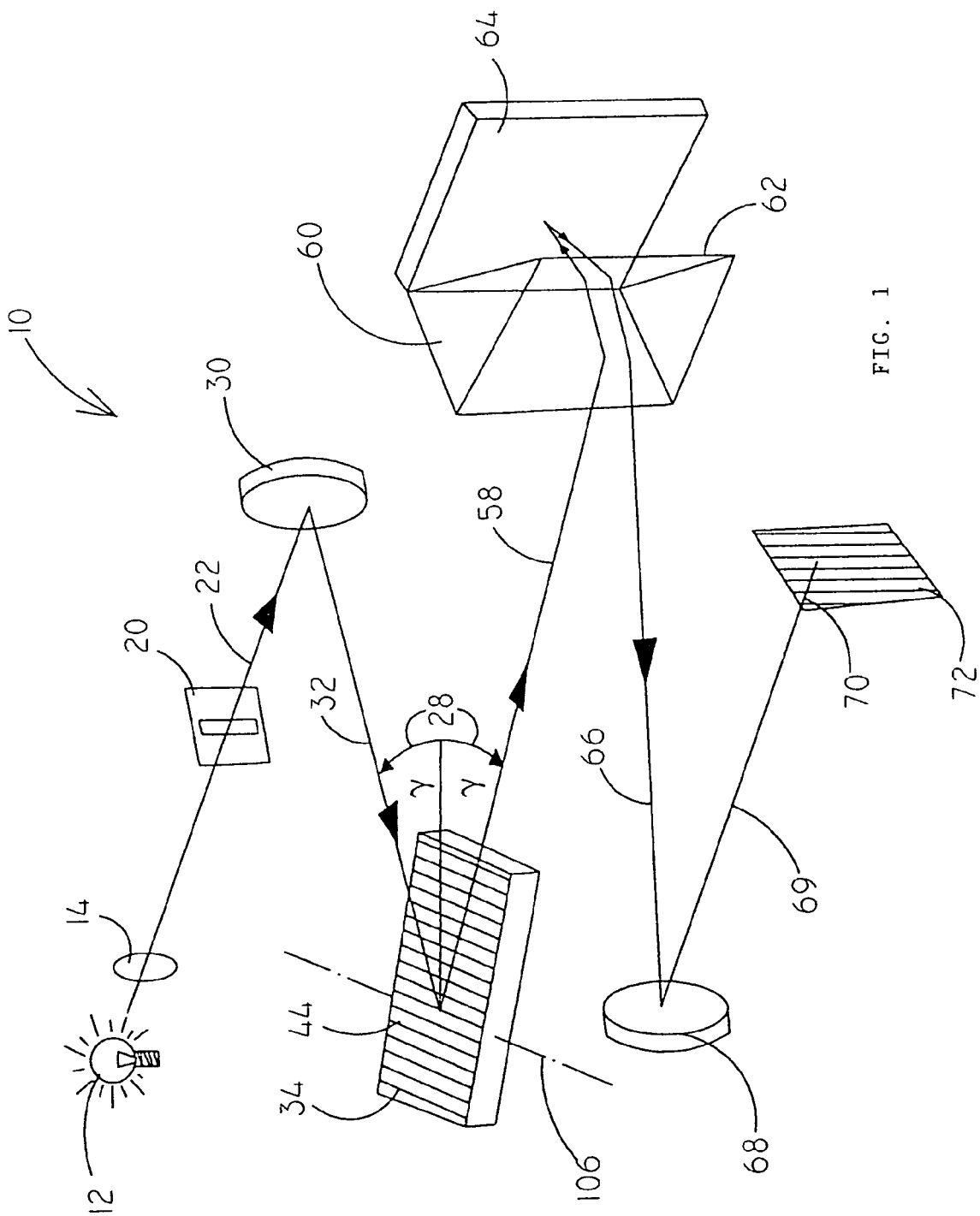

In FIG. 1 an echelle spectrometer 10 according to the invention is schematically shown. The light of a light source 12 is focused by means of a lens 14 or a mirror onto an entrance slit 20. The optical axis is represented by a line 22 in FIG. 1. The light enters through the entrance slit 20 and is parallelized by means of a spherical concave mirror 30. Then the parallel bundle 32 meets an echelle grating 34 where it is dispersed. The grooves of the grating 44 run in a horizontal direction. The dispersion is perpendicular to the grooves, i.e. in a vertical direction in FIG. 1.

Figure 2:
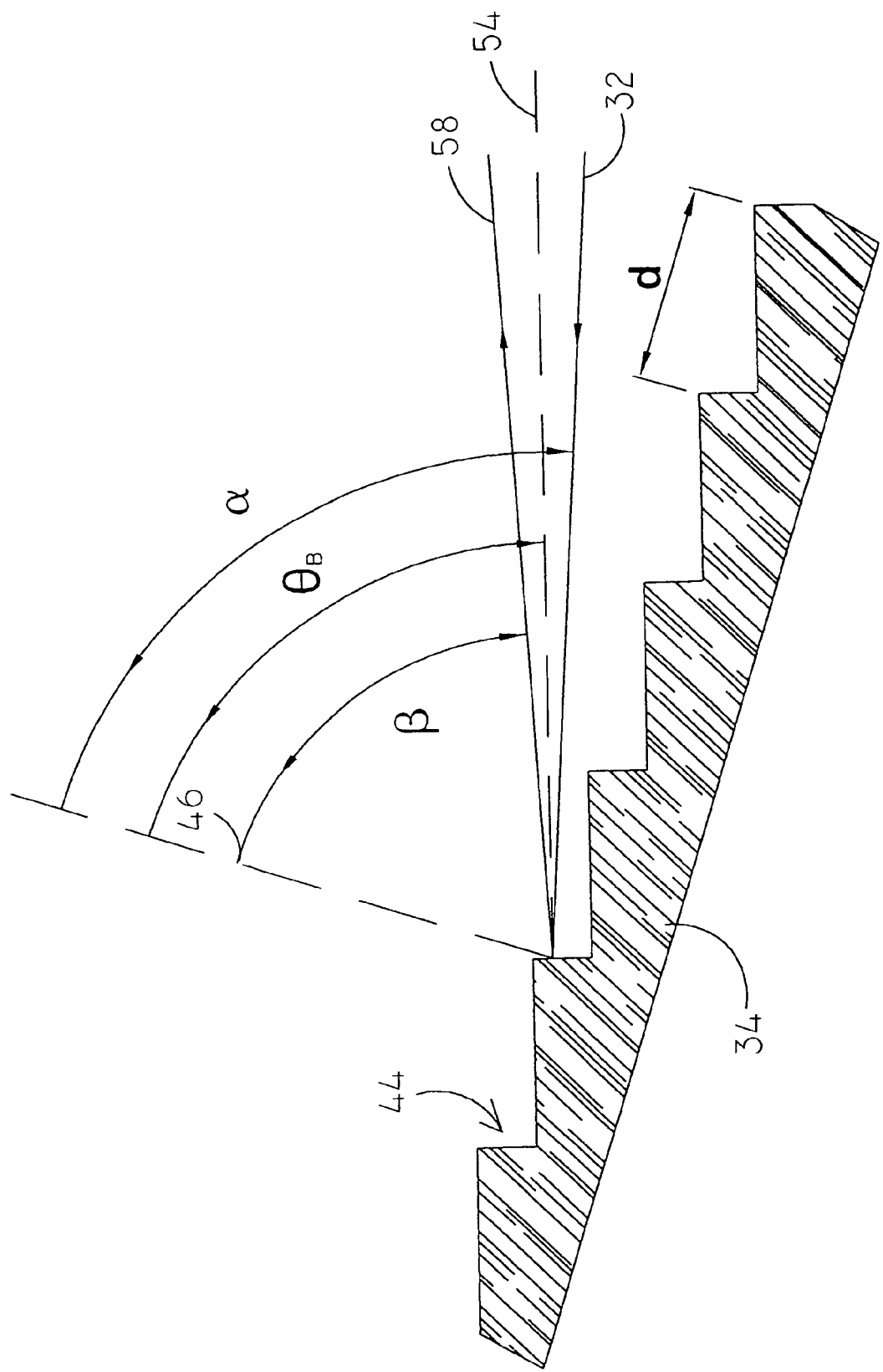
FIG. 2 shows a side view of an echelle grating.

In FIG. 2 the echelle grating 34 again is shown in greater detail. The distance between the grooves of the grating is denoted d. The angle between the incoming beam 32 and the normal line 46 on the grating is denoted α. The angle between the diffracted beam 58 and the normal line 46 on the grating is denoted β. $\theta_B$ denotes the blaze angle of the grooves 44 of the echelle grating 34. The parallel light bundle 32 in FIG. 1 falls onto the echelle grating 34 under a very flat angle relative to the dispersion plane. The angle is almost 90 degrees minus the blaze angle of the echelle grating.

Due to the large blaze angle the intensity of the diffraction image is concentrated for the measuring wavelengths in a high diffraction order in a typical range between the $30^{th}$ and $130^{th}$ order. A high diffraction order causes a high dispersion. Also a large diffraction angle, which in the present case is 76 degrees, causes a high dispersion. The echelle grating 34 has a small number of grooves of 75 grooves per millimeter to obtain an angular dispersion for wavelengths in the range of 190 nm to 852 nm which is as high as possible. Typically 25 to 250 grooves per millimeter are used for the number of grooves. Due to the large angle of incidence the grating 34 has to be correspondingly large, if the entire light shall meet the grating.

The parallel bundle 32 meets the grating 34 under an angle 28, the so called off-plane angle relative to a plane which is perpendicular to the grooves of the grating. This is shown in greater detail in FIG. 3. There the bundle is reflected in the plane parallel to the grooves 44 of the grating and is diffracted within the dispersion plane which is perpendicular thereto.

Figure 3:
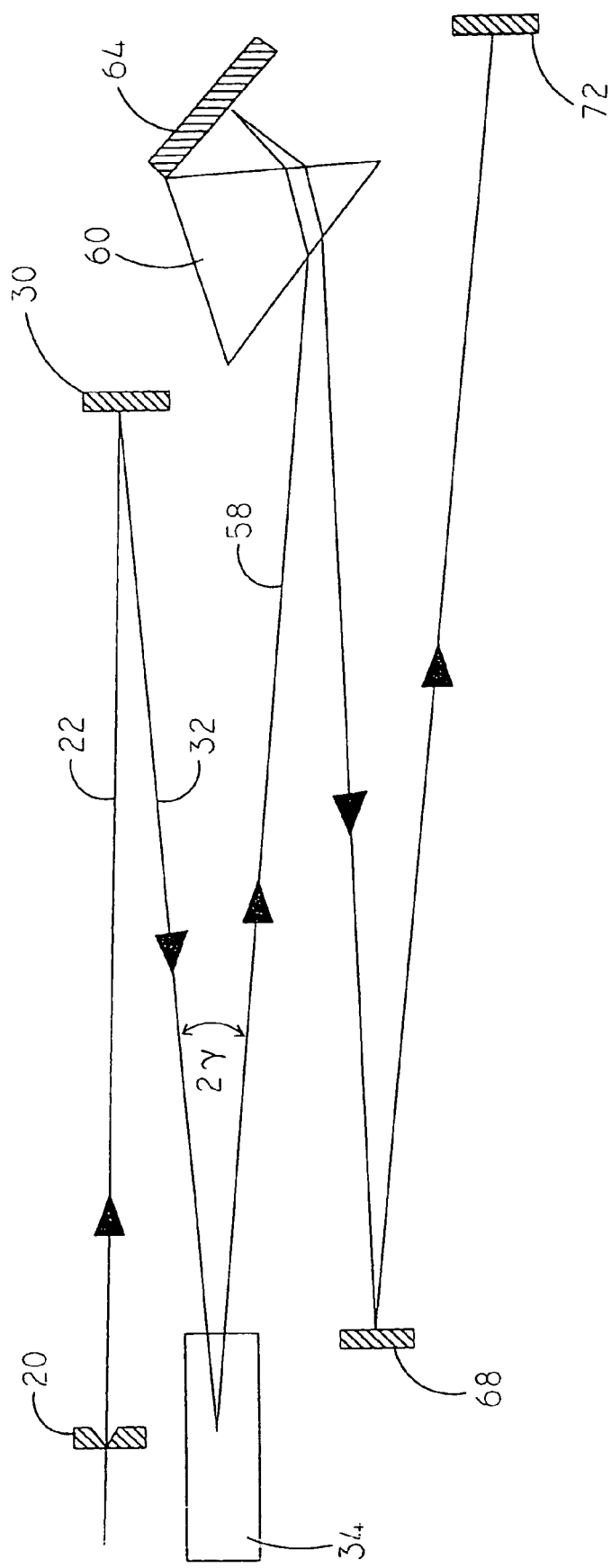
FIG. 3 is an elevated view on the light path in the echelle spectrometer of FIG. 1.

The reflected and dispersed beam 58 is guided through a prism 60 with a roof edge 62. In FIGS. 1 and 3 the edge 62 of the prism 60 runs in a vertical direction. The beam 58 is dispersed in the prism 60, meets the plane mirror 64 therebehind and is reflected back into the prism 60. There the beam is dispersed again. Corresponding to the vertical edge 62 of the prism 60 the beam is twice dispersed in a horizontal direction (lateral dispersion), i.e. perpendicular to the dispersion direction of the grating (main dispersion direction). The orders overlapping in the main dispersion direction are spaced apart and curved by the lateral dispersion of the prism 60 in a direction perpendicular to the main dispersion direction, the lateral dispersion being much smaller than the main dispersion.

After focussing the bundles 66 which are parallel for exactly one wavelength by means of a further spherical concave mirror 68 a focussed beam 69 is obtained. A two-dimensional spectrum 70 is generated in the exit plane 72.

A typical spectrum of a continuous light source is schematically shown in FIG. 4. The wavelengths are distributed in the main dispersion direction in the direction of the arrow 74. The various orders are spaced apart in the lateral dispersion direction represented by an arrow 76. In such way the $99^{th}$ order 78, for example, is located adjacent to the $100^{th}$ order denoted with numeral 80.

A charge-coupled-device (CCD) detector 82 with common features is arranged in the exit plane. The CCD detector is provided with picture elements 84 being arranged in a rectangular grid with horizontal detector lines 94 and vertical detector columns 92. The detector is orientated such that the detector lines 94 extend essentially along the diffraction orders of the echelle grating 34. Due to the prism dispersion, however, the diffraction orders 78, 80 are slightly curved, not parallel and not with constant distance from each other. In FIG. 4 this is shown in a slightly exaggerated manner for better demonstration.

Each picture element can be allocated to a pair (x,y) unambiguously describing its position. The x-value corresponds to the $x^{th}$ detector column from the left and the y-value corresponds to the $y^{th}$ detector line from the bottom.

The grating 34 is movable about an axis 106 running parallel to the grooves 44 of the grating. The axis 106 extends along a bending element 112 (s. FIG. 5). The bending element connects an upper metal plate 110 with a lower metal plate 114. The grating 34 lays on the upper metal plate 110 and is glued to it. The lower metal plate 114 lays on a wedge 122 the angle of which being essentially 90 degrees minus the blaze angle of the grating. A piezoelectric element 116 projects on the side of the grating through the upper metal plate 110 and its end generates a pressure on the lower metal plate 114. If the voltage at the piezoelectric element 116 is increased it expands and the pressure on the lower metal plate 114 is increased. Thereby the grating is rotated further in the direction of the arrow 124. Reducing the voltage accordingly causes a rotation of the grating in the opposite direction.

In a not explicitly shown alternative the rotation is effected by means of a computer controlled stepper motor and a fine spindle connected thereto. With the rotation of the grating 34 a shift of the line of a selected wavelength can be effected essentially in the direction of the main dispersion in the exit plane, i.e. in the direction of the arrow 74 in FIG. 4 or in the opposite direction thereof, respectively.

In FIG. 6 the prism arrangement is shown. A brass stick 126 is connected with an invar housing 128 at a fixing point 127. The invar housing 128 is fixed to a metal housing 130. The brass stick 126 extends through the metal housing 130 and projects from it at its free end 132. The metal housing 130 firmly connected to the mechanical set up of the spectrometer is connected to a metal block 136 via a bending element 134. The prism 60 is glued to the metal block. If the environmental temperature increases the prism dispersion increases. With an increasing temperature the brass stick 126 expands the invar housing 128 does not or only neglegeably expand due to the properties of invar. Because of the expansion of the brass stick a pressure is generated on a pressure point 140 on the surface of the metal block 135. The distance 138 between the metal housing 130 and the metal block 136 changes at this point in such a way, that a rotation of the metal block 136 about the bending element is effected. The bending element 134 forms the rotational axis therein. By rotating the metal block 136 the prism 60 connected thereto is rotated in such a way that the incident angle $\alpha_p$ and thereby the dispersion is reduced. With suitable layout of the components of the arrangement this reduction of the dispersion can be regulated by the rotation in such a way that the increase of the dispersion due to the increase of the prism temperature coupled to the temperature of the environment is just compensated.

In an not explicitly shown alternative Example the prism 60 is rotatable about the edge 62. This rotation can also be stepper motor or piezoelectric controlled. For this purpose the prism 60 is fixed to a rotatable table. Turning the prism 60 will cause a shift of all orders in the direction of the arrow 76 (FIG. 3) or its opposite direction, respectively, apart from changing the lateral dispersion.

The camera mirror 68 two piezoelectric crystals are provided which are controlled by a computer and a voltage supply. The piezoelectric elements are arranged at the camera mirror in such a way, that it can be rotated about two axis by means of the piezoelectric elements. Thereby the entire spectrum can be shifted in the exit plane in a vertical and in a horizontal direction without major distortions.

In FIG. 7 and FIG. 8 the set up of the camera mirror 68 is shown in greater detail. A vertical plate 150 is screwed to the base plate 148 of the spectrometer. The camera mirror 68 is flexibly fixed to this plate 150 with its back, wherein a gap 152 is provided between the back of the camera mirror 68 and the plate 150. A further plate 154 sits in this gap 152 and is connected to the plate 150 with a joint element which is flexible in two perpendicular directions. Two piezoelectric elements 156 and 158 extend through this plate 154. The piezoelectric elements 155 and 158 are firmly connected to the plate 154. If one or both piezoelectric elements expand a pressure is produced at a pressure point on the surface of the vertical plate 150 and the plate 154 is tilted. The plate 154 is adjacent to the back of the mirror 68. Thereby the mirror is also tilted. The rotation is effected mainly about a horizontal axis 160 (s. FIG. 8), if the pressure is generated by the piezoelectric element 158 and mainly about a vertical axis 162, if the pressure is generated by the piezoelectric element 156.

The plane detector 82 in the exit plane 72 of the spectrometer is also rotatably mounted. This is shown in FIG. 9. The rotation axis 164 is normal to the detector surface 166. The detector 82 can be rotated by a defined angle with a suitable arrangement of a further piezoelectric crystal which is computer controlably supplied with a voltage, too.

The detector 82 is arranged on an inner metal block 168 which is connected to an outer metal block 170 via a bending element coinciding with the rotation axis 164. The outer metal block 170 is firmly connected to the base plate of the spectrometer. The outer metal block 170 extends around three sides of the metal block, a gap 172 forming between the blocks. A piezoelectric element 174 projects through the outer metal block 170 which extends through the gap 172 and presses on the inner metal block 168. The pressure point between the piezoelectric element 174 and the inner metal block 168 lays in a distance from the bending element 164. If the piezoelectric element expands/shrinks due to a voltage change the inner metal block 168 with the detector attached thereon is rotated about the axis 164.

The device is exposed to drifts due to temperature- or pressure changes or other changes of the environment of the device, which means a mechanical shift or rotation of all optical components from their reference position. Because of this drift the spectral lines on the detector can be shifted, distorted or rotated. Also the distance between two spectral lines can change.

At first the device is adjusted in order to determine the intensity profile of the light from a light source 12 as a function of the wavelength (spectrum). For this purpose the profile of the orders the position of the orders are compared to their respective reference.

The manipulating elements at the grating, prism, camera mirror and detector must be regularly adjusted to maintain the spectral lines over the entire spectral range in a defined reference position with a deviation of less than a pixel width. In an air-conditioned laboratory one adjustment per day usually is sufficient, while arrangements used for example outside in a mobile use have to be adjusted practically before each measurement.

Those manipulating elements are activated which have the greatest effect on the spectrum regardless of the cause of the initial shift from the reference position. The cause of a shift very often cannot be found anymore. If for example the detector is linearly shifted from its position this can stil be adjusted by the piezoelectric elements at the camera mirror.

First of all, all optical components, i.e. grating, camera mirror and detector are set in a middle position when mounting the device. Then a reference light source emitting spectral lines over a wide range of the spectrum is arranged before the entrance slit of the spectrometer and adjusted in such a way that sharp lines appear on the detector. A noble gas Pen-Ray-lamp, for example, is suitable as a reference light source.

The position of the spectral lines in this state is stored as a reference position. This is in the form of x- and y-values for the description of the detector picture element and the respective intensity in relative units. For each manipulating element and for each reference line a combination of values of manipulating variables is determined for obtaining the reference spectrum. The combination of values of manipulating variables have to be experimentally determined, because tolerances of manufacturing, deviations of the position of the axes between the various devices and other differences between corresponding components of different spectrometers lead to different combinations of values of manipulating variables. Once it is determined it can be used as long as the same components are used.

The manipulating variables are dependent from each other. If, for example, the distance between two spectral lines in the same order is too large compared to the distance between the same lines in the reference spectrum, this cannot be simple compensated by rotating the grating. A rotation of the grating also causes a shift of the two lines which in turn has to be compensated by tilting or rotating the camera mirror. Such a rotation also can cause a rotation of the entire spectrum in the exit plane. This is then compensated by rotating the detector.

However, there is a set of values of manipulating variables for each spectrum for shifting the spectrum into its reference position. This relationship between the positions of spectral lines and a set of values for the manipulating variables is stored for each spectrometer as fixed values and can be used for the adjustment. The manipulating variables in the present case are: "grating angle", "horizontal position of the entire spectrum", "vertical position of the entire spectrum" and "detector angle". The positions of the spectral lines are characterized by their values for the x- and y-positions, the wavelength, the half-width and the intensity of the spectral line. X and Y denote the position of the picture element.

For the adjustment the position of the spectral lines of the reference light source is determined and compared to the stored reference spectrum. Then the manipulating elements are activated according to the stored relationship. In a further step the position of the spectral lines is checked again. If the spectral lines are within a given interval around the reference position the spectrometer is in the "reference condition". However, the relationship possibly is not perfect. This can be due to non-linearities or due to the rotation axes not being in their optimum position. The spectral lines will then be closer to their reference position but not directly on it. Therefore the adjusting procedure is repeated until all spectral lines are at their reference positions. Depending on the quality of the relationship and the manipulating elements only one up to as many as 100 repetitions can be necessary. Afterwards all spectral lines can be found at their reference positions. The spectrometer then has a very exactly defined resolution. The arrangement is also suitable for the "online"-stabilization. An adjustment is then carried out in regular short intervals.

In FIG. 10 and FIG. 11 a shift of the position of various spectral lines is shown with changing temperature. Three spectral lines are shown, two of which (Ne1, Ne2) lay in two adjacent orders at the end of the order while the third (Zn2) in a third order lays in the middle of the order. In FIG. 10 only the first Neon-line denoted Ne1 is stabilized, i.e. only the translation of the spectrum is compensated by the two piezoelectric elements at the camera mirror. In FIG. 11 the whole stabilization is active, i.e. additionally the piezoelectric element at the grating and at the detector and the passive prism compensator. One can clearly see that the lines drift considerably less than without the stabilization. The Zero-positions for Ne2$x$, Ne2$y$, Zn2$x$ and Zn2$y$ are shown paralelly shifted for a better view.

In order to obtain a good signal-to-noise ratio the intensities of those detector elements illuminated with light of the same wavelength are added up (binning). First of all the detector elements which belong together are determined. These "binning ranges" run about perpendicular to the orders which are curved due to the prism dispersion.

At first a detector column 180 in about the middle of the detector 184 is selected, which runs essentially lateral to the orders 182 (FIG. 12). If the orders run essentially along the columns, a detector line is selected. The light of a continuous light source emitting a continuous spectrum over the entire considered range is coupled into the spectrometer and the intensities I on the detector elements of the detector column 180 is measured. The profile of the intensities as a function of the y-value along the detector column is shown in FIG. 13.

The middles of the orders are about at the maxima 184, the minima 186 represent the middles between the orders. For determining the binning ranges first the exact path of the orders of each interesting order has to be determined. This can be done by describing the minima between the orders or by describing the maxima of the orders. The minima are more pronounced than the maxima in the present case and are therefore chosen. If the separation of the orders is large, the maxima are more suitable.

In a next step those detector elements are determined on which the intensity has a local minimum. These represent the middle of the orders. In FIG. 13 they are the y-values at y=32, 66, 98 . . . 1010. Those values together with the x-value of the detector column represent the starting values for the various orders.

Next, the proceeding of the minimum along the order has to be followed and described. For this purpose a starting value is determined beginning with a local minimum ($x_S$+ $1y_m$) and then the next higher and lower detectorelement ($x_S$+1 $y_m$±1) along the order is selected. The picture element of the three picture elements with the lowest intensity is considered as the minimum between the two adjacent orders for this neighbouring detector column. This one again serves as the starting value for the selection of the next three adjacent picture element from which again the one with the lowest intensity is selected. This procedure is repeated on both sides of the initial column for each order until all minima are determined for each column. The entity of all selected picture elements runs along the minimum between two orders. Three pixels are sufficient for the determination of the minima, because there are no jumps in the profile of the orders.

The profile of the minimum between two orders is described by means of a fitting function running through the selected minima, for example a polynomial function of second or third order. Thereby a compensation of digitalizing effects is achieved, which are caused by the geometric distribution of the minima running in digits. The degree of the polynomial depends on the degree of the curvature and is 2 or 3. A polynomial function of second degree is suitable for the described spectrum. It is written as:

$$y_{min}(x) = a_0 + a_1 x + a_2 x^2$$

wherein the coefficients $a_0, a_1$, and $a_2$ are the fitting parameters and x is the column number. This procedure is repeated for each order until all orders are described by polynomial functions with fixed coefficients. The result of this fitting procedure is shown in FIG. 14. There all the fitting functions 188 y(x) are shown for all interesting orders.

The binning ranges are then all detector elements of one column between each two adjacent fitted functions. The functions also can be non-integers. In this case the functions are fixed to their average over the width of a detector element. Accordingly, the intensity at this detector element is only proportionally considered at the binning. Thereby the digitizing effect usually occurring with binning is compensated.

A group of functions is obtained which can be stored as such in the form of its coefficients. In the present case, however, the group of functions was fitted by a secondary fitting of the coefficients. For this purpose the coefficients were shown as a matrix:

$$a_{0,1}, a_{0,2} \cdots a_{0,m}$$

$$a_{1,1}, a_{1,2} \cdots a_{1,m}$$

$$a_{2,1}, a_{2,2} \cdots a_{2,m}$$

and the corresponding coefficients of each order, for example the constant members $a_{0,1}, a_{0,2} \cdots a_{0,m}$ again are described by a fitting function. 3 coefficients remain for each secondary fitting function. This means, that the entire group of functions can be described by 9 coefficients. Using a polynomial function of third degree, 16 coefficients would be sufficient. Thereby the amount of data for describing the shape of the orders is considerably reduced. Furthermore the functions $y_m(x)$ are more reliable, because digitizing effects, noise etc. are minimized by the fitting.

Determining the binning ranges for the real measurement the picture elements are considered proportionally but column-wise discrete. The binning range represents the range between two minima and correspondingly the intensity values are added up. By this procedure one obtains a two dimensional intensity distribution (I(x,y) of a group of one dimensional spectra $I_m(x)$, wherein m denotes the order.

To obtain the function I(λ) which is the one interesting to the spectroscopist, $I_m(x)$ has to be calibrated. For this purpose a wavelength λ has to be allocated to each position x of the binned spectrum. Therefore, first the function $\lambda_m(x)$ is sought.

The calibration is effected by comparison of the measured spectrum to a reference spectrum, which has been measured with a line emitting source with a large amount of spectral lines. A section of such a spectrum is shown in FIG. 16 and FIG. 17. In the UV-range between 200-350 nm the platinum lines are particularly suitable. The line data are already present in the form of a file (folio). In this file the wavelengths of the centers of gravity of the lines and the relative intensities are stored. In the range between 650 nm-1000 nm the noble gas lines of a Pen-Ray-lamp are suitable, where the spectra were added up by software.

First, the recorded spectrum has to be corrected for broadband background. In FIG. 16e the background is denoted with numeral 190. The spectral lines are denoted with numeral 192. The broadband background originates, for example, from scattered light, non-resolved rotational-vibration-bands of molecules or the like.

There are several background correction methods. Usually the background is first determined and then subtracted from the initial spectrum. For the determination of the background the function $I_m(x)$ is smoothed by moving average. This means that at each point x the intensity I(x) is replaced by the average $$\bar{I}(x) = \frac{\sum_{v}^{v_{max}} I(x_v)}{v_{max}}$$

The width $v_{max}$ of the moving average corresponds to about double of a line width. If the average line width is about 5 pixels, then $V_{max}$=10. For the smoothed function each value of the initial graph being higher than the value of the smoothed graph is set to the value of the smoothed graph.

In the next step the such modified graph again is smoothed with moving average. Again after this repeated smoothing of the modified graph the graph is again modified by setting the values being higher than the value of the smoothed graph to the value of the smoothed graph. The result of a 2-fold smoothing is shown in FIG. 16a. It can be seen that the peaks shrink while the rest of the smoothed graph fits well to the initial graph.

The smoothing procedure and the setting of the values at the peaks is repeated 100 times. The initial values and the graphs with 5-times, 10-times, 50-times and 100-times repetition are shown in FIG. 16b to FIG. 16e. In the end the smoothed graph represents the initial graph without peaks, i.e. it describes the broadband background.

In FIG. 17a the background 190 and the initial curve 194 with peaks 192 is shown. In the next step the correction is carried out by subtracting the background from the initial graph. The graph of the difference 196 is shown in FIG. 17b. It can be seen that apart from noise only the peaks 192 are present in the spectrum the binned and background corrected graph can then be used for further calibration.

First a starting value is determined. This is a line which is well known to the spectroscopist. Examples for such a line are: Lines occurring in several orders, Na-Doublett, Hg 253 and others having a particularly prominent profile or which are well known to the spectroscopist for another reason. The known, exact wavelength and the known order number $m_0$ is allocated to these first known lines. Furthermore all spectral lines with a intensity above a given value are determined. This is achieved by first fixing a threshold and determining the maximum of each line exceeding this threshold. A spectral line is assumed if the line flanks monotonously drop on both sides of the maximum to a percentage of 30% of the maximum. For each line fulfilling this criterium the exact position of the center of gravity is determined as well as the intensity and the half-width (in pixels) of the line. The position (=x-value) of the center of gravity does not have to be an integer value.

The result of this procedure is a catalogue of reference lines with well known positions on the detector and characteristics. For the first, known Lines in a known first order (starting order) a wavelength scale is determined by fitting the wavelength $\lambda_i$ with a polynomial function according to:

$$\lambda_m(x)=a_0(m_0)+a_1(m_0)x+a_2(m_0)x^2$$

It is preferable if the known first order is in the middle of the spectrum. The value of the order can be determined from the given values of the grating. This wavelength scale now serves as a base for the calculation of a provisional wavelength scale for the next adjacent order m±1 according to $$\lambda_{m\pm1}(x)=\lambda_m(x)\pm\Delta\lambda_{FSR},$$

wherein the "free spectral range" is $\Delta\lambda FSR=\lambda_m(x)/m$. The provisional wavelength scale is sufficient to identify reference lines laying in this order. The wavelengths of the reference lines are taken from the exact wavelengths (folio) and allocated. From the folio values and the exact positions of the centers of gravity of the reference lines again an exact wavelength scale is determined by polynomial fitting. Therein only such reference lines are considered where the folio value coincides with the center of gravity wavelength of the provisional wavelength scale within a given tolerance. From this fitting again the next provisional wavelength scale for the next order m±2 is determined which again is used for identifying the reference lines. In such a way all orders are dealt with for which a wavelength scale shall be determined.

A complete relationship between the wavelengths and the positions is obtained. In the method lines with bad fitting parameters due to a bad folio value or a wrong identification are not considered. The selection of "bad" lines can be manually or automatically achieved. In the latter case the quality criteria for the fitting parameters have to be inserted in the form of tolerances.

If the wavelength scale is determined for each order the coefficients form a matrix. The corresponding coefficients show a dependence on the order. This dependence again can be described by a fitting function. Therein a polynomial was found to be suitable for the fitting function of the coefficients of the $0^{th}$ order which also takes into account the 1/m-dependence:

$$a_0(m)=a_{00}m^{-1}+a_{01}m+a_{02}m^2+a_{03}m^3$$

$$a_1(m)=a_{10}+a_{11}m+a_{12}m^2+a_{13}m^3$$

$$a_2(m)=a_{20}+a_{21}m+a_{22}m^2+a_{23}m^3$$

In such a way the wavelength function $\lambda(x)$ can be described and stored with only a few coefficients. The spectrum $I(\lambda)$ can be obtained from $I(\lambda)=I(\lambda(x))$.

In FIG. 18 an echelle spectrometer according to another embodiment is shown. The light, represented by the optical axis 200 is pre-dispersed before entering the spectrometer. For this purpose an arrangement consisting of the entrance slit 202, UV-coated toroid mirrors 204 and 206 and a prism 208 is provided. The light enters the entrance slit arrangement 210 with two perpendicular, shifted entrance slits 212 and 214. A collimating mirror 216 in the form of a spherical mirror reflects the bundle in the direction of the echelle grating 218. Between the echelle grating 218 and the collimating mirror 216 a prism is arranged for lateral dispersion. After the dispersion at the grating 218 the light again goes through the prism and falls onto the camera mirror 222. The camera mirror 222 focuses the dispersed light in the exit plane 224.

The grating is rotatably mounted about an axis 226. The prism is rotatably mounted about an axis 228. The camera mirror is rotatably mounted about the two axes 230 and 232 and the detector (not shown) is rotatably mounted about an axis 234. By this arrangement the adjustment of the spectrum in the exit plane to a reference position is possible in a similar way as with the first embodiment.

The invention claimed is:

1. A spectrometer arrangement, comprising an echelle spectrometer and a light source emitting light and means for directing said light in the form of a light beam into said echelle spectrometer, the echelle spectrometer comprising:
   entrance slit means,
   echelle grating means for dispersing light incident thereon in a main dispersion direction,
   further dispersing means for further dispersing said light in a dispersion direction lateral to said main dispersion direction,
   an exit plane,
   further optical means for directing said light as a beam from said entrance slit means to said exit plane focussing said light beam in the form of a two dimensional spectrum in said exit plane,
   a planar detector means with a plurality of detector elements positioned in said exit plane,
   means for defining a reference position for said two dimensional spectrum on said detector, and
   manipulating means for manipulating position of said echelle grating means, further dispersing means and/or further optical means to cause a change of shape and/or position of said spectrum in said exit plane wherein said manipulating means are a combination of setting and controlling means for setting and controlling the position and the shape of said spectrum to said reference position and each wavelength of the spectrum allocated to a picture element is determined according to a constant relationship.

2. Spectrometer arrangement according to claim 1, wherein position and size of the picture elements are adapted to slit size of the entrance slit arrangement.

3. Spectrometer arrangement according to claim 1, wherein the manipulating means are provided on those optical means, which cause the largest possible shift of the position of a spectral line in the exit plane.

4. Spectrometer arrangement according claim 1, wherein at least one of the manipulating means is formed by a piezoelectric element connected to a controlled voltage supply.

5. Spectrometer arrangement according to claim 1, wherein a fine spindle driven by a stepping motor is provided as one of said manipulating means for setting or controlling an angle of incidence on the echelle grating.

6. A spectrometer arrangement, comprising an echelle spectrometer and a light source emitting light and means for directing said light in the form of a light beam into said echelle spectrometer, the echelle spectrometer comprising:
   entrance slit means,
   echelle grating means for dispersing light incident thereon in a main dispersion direction,
   further dispersing means for further dispersing said light in a dispersion direction lateral to said main dispersion direction,
   an exit plane,
   further optical means for directing said light as a beam from said entrance slit means to said exit plane focussing said light beam in the form of a two dimensional spectrum in said exit plane,
   a planar detector means with a plurality of detector elements positioned in said exit plane,
   means for defining a reference position for said two dimensional spectrum on said detector, and
   manipulating means for manipulating position of said echelle grating means, further dispersing means and/or further optical means to cause a change of shape and/or position of said spectrum in said exit plane wherein said manipulating means are a combination of setting and controlling means for setting and controlling the position and the shape of said spectrum to said reference position and each wavelength of the spectrum allocated to a picture element is determined according to a constant relationship,
   wherein said further dispersing means is a prism and a compensator connected to said prism is provided which expands or shrinks with temperature changes in such a way that it causes a rotation of said prism compensating changes of said prism dispersion due to temperature changes.

7. Spectrometer arrangement according to claim 6, wherein the compensator comprises:
   (a) a brass cylinder,
   (b) an invar hollow cylinder for coaxially receiving said brass cylinder,
   (c) a first metal block firmly connected to said invar hollow cylinder said brass cylinder extending through said invar hollow cylinder and said metal block and projecting therefrom, and
   (d) a second metal block connected to said prism and connected to said first metal block via a bending element in such a way that said brass cylinder generates a pressure on said second metal block which depends on the temperature.

8. Spectrometer arrangement according to claim 1, wherein said detector is fixed on a first fixing element connected to a second fixing element via a bending element and by which a pressure to the corresponding fixing element by a piezoelectric element provided on one of the fixing elements is generated in such a way that said detector is rotatable by a selected angle.

9. Spectrometer arrangement according to claim 1, wherein memory means are provided for storage of said relationship in the form of values for possible position shifts of spectral lines and in form of corresponding manipulating values for each of manipulating variables for shifting a spectral line from a measured position to said reference position.

10. Method for compensation of shifts of a spectrum in an exit plane of a spectrometer according to claim 1, comprising:
   (a) defining a reference position for said spectral lines and determining an actual position of selected spectral lines,
   (b) comparing said actual position of said spectral lines with said reference position,
   (c) determining a combination of manipulating values for the manipulating means according to a relationship allocating a defined combination of manipulating values to each change of position, and
   (d) activating manipulating means according to said combination of manipulating values.

11. Method according to claim 10, further comprising the step of defining a tolerance and wherein steps (a) to (d) are repeated until said position of said spectral lines are within said tolerance of said reference position.

12. A spectrometer arrangement, comprising an echelle spectrometer and a light source emitting light with a continuous wavelength spectrum and means for directing said light in the form of a light beam into said echelle spectrometer, the echelle spectrometer comprising:
   entrance slit means,
   echelle grating means for dispersing light incident thereon in a main dispersion direction in a plurality of spectral orders,
   further dispersing means for further dispersing said light in a dispersion direction lateral to said main dispersion direction and thereby separating said orders in said lateral direction into curved spectral orders,
   an exit plane,
   further optical means for directing said light as a beam from said entrance slit means to said exit plane focussing said light beam in the form of a two dimensional spectrum in said exit plane,
   a planar detector means with a plurality of detector elements positioned in said exit plane,
   means for detection of detector elements on which said light of said light source with a continuous wavelength spectrum is a minimum between said curved orders,
   computer means for determining a function $I_m(x)$ representing a one-dimensional intensity spectrum from a plurality of points x,y on the detector and a respective intensity distribution I (x,y), and
   means for accumulating an intensity measured with selectable, adjacent detector elements.

13. Spectrometer arrangements according to claim 12, wherein the separation of said orders is such that intensity minima between the orders do not extend beyond more than two detector elements perpendicular to the orders.

14. Method for determining binning ranges on a planar detector for two dimensional echelle spectra in the exit plane of an echelle spectrometer according to claim 12, comprising:
(a) for each column (x) determining a position (x, $Y_{min,m}$) of a detector element where an intensity (I) of the light source with the continuous spectrum (I($\lambda$)=constant) is a minimum ($I_{min}$=I(x,$y_{min,m}$)) between the orders (m and m+1),
(b) determining a function ($y_{min,m}$(x)) representing a shape of the intensity minimum ($I_{min}$) between two orders (m and m+1) as a function of the column number (x),
(c) repeating steps (a) and (b) for the shape ($y_{min,m-1}$(x)) of at least one intensity minimum between the next adjacent orders (m−1 and m),
(d) determining the binning ranges for one order (m) being the sum of all detector elements (x, y) for which:

x=constant and $y_{min,m-1}(x) < y < y_{min,m}(x)$.

and providing the determined binning ranges on a planar detector for two dimensional echelle spectra in the exit plane of an echelle spectrometer.

15. Method according to claim 14, wherein the position of the detector element according to step (a) is determined by the following steps:
(a1) selecting of a detector column (x),
(a2) illuminating the spectrometer with the light of a light source with a continuous spectrum
(a3) determining the detector element in the selected column (x), whereon lays the intensity minimum of a selected order (in),
(a4) determining the detector element in the next adjacent column (x+1), wheron lays the intensity minimum of three adjacent detector elements right next to the detector element determined in step (a3) and
(a5) repeating step (a4) for all columns (x).

16. Method according to claim 14, wherein the function according to step (b) is formed by a polynomial fitting function of second or third order $y_{min}$=y(x) through the detector elements determined according to step (a) and wherein the coefficients of said polynomial function are stored.

17. Method according to claim 16, wherein an order dependent, secondary polynomial fitting function of second or third order is formed from the corresponding coefficients of said polynomial function of each order and the polynomial coefficients of said secondary fining function are stored.

18. Method according to claim 14, wherein the binning ranges proportionally consider the intensities of the detector elements of a column belonging to the same order, if the value of the fitting function is not an integral value in the middle of the detector element in a direction of the lines.

19. Method for calibrating a spectrometer arrangement, comprising an echelle spectrometer and a light source emitting light with a line spectrum and means for directing said light in the form of a light beam into said echelle spectrometer, the echelle spectrometer comprising:
entrance slit means,
echelle grating means for dispersing light incident thereon in a main dispersion direction,
further dispersing means for further dispersing said light in a dispersion direction lateral to said main dispersion direction,
an exit plane,
further optical means for directing said light as a beam from said entrance slit means to said exit plane focussing said light beam in the form of a two dimensional spectrum in said exit plane,
a planar detector means with a plurality of detector elements positioned in said exit plane,
means for identifying at least one spectral line of said line spectrum,
means for storing and displaying reference wavelengths for said line spectrum, wherein the wavelengths are distributed on a multiplicity of orders, comprising the steps
(a) detecting a reference spectrum having many lines with known wavelengths for a plurality of the lines,
(b) determining the position of a plurality of peaks of the reference spectrum in the so detected spectrum,
(c) selecting at least two first lines in a known order with a known position and wavelength,
(d) determining a wavelength scale for this order in which the known lines are positioned by a fitting function $\lambda_m(x)$,
(e) determining a provisional wavelength scale $\lambda_{m-1}(x)$ for at least one adjacent order m±1 by adding/subtracting a wavelength difference $\Delta\lambda_{FSR}$ corresponding to the free spectral range according to $\lambda_{m\pm1}(x)=\lambda_m(x)\pm\Delta\lambda_{FSR}$, with $\Delta\lambda_{FSR}=\lambda_m(x)/m$ (f) determining the wavelength of lines in this adjacent order m±1 by means of the provisional wavelength $\lambda_{m\pm1}(x)$,
(g) replacing the provisional wavelength of at least two lines by the reference wavelength of these two lines according to step (a),
(h) repeating steps (d) to (g) for at least one further neighbouring order, and
calibrating the echelle spectrometer using the determined wavelength scale.

20. Method according to claim 19, wherein the reference spectrum is formed from the line spectra of several reference light sources.

21. Method according to claim 19, wherein a background correction with respect to broadband background is carried out before the calibration in step (b) which comprises the following steps:
(a1) smoothing of the recorded spectral graph
(a2) determining of all values in the initial graph having a value higher than the value of the smoothed graph and reducing such values to the value of the smoothed graph,
(a3) repeating the steps (a1) to (a2) at least twice,
(a4) subtracting the background graph obtained in such a way from the initial graph.

22. Method according to claim 21, wherein the smoothing of the graph is carried out by moving average, and wherein the width of the moving average is twice as much of an average line width of a reference line.

23. Method according to claim 19, wherein the position of the peaks in the reference spectrum are determined by the steps
(b1) fixing a threshold value,
(b2) determining maxima in the shape of the graphs above the threshold value (b3) selecting those maxima, where the adjacent pixels form peak flanks, which monotonously drop on both sides of the maximum to a given percentage of the maximum, and (b4) determining a center of gravity of the peak as the position of those peaks the maxima of which have been selected according to (b3).

24. Method according to claim 19, wherein the known first lines lay in the middle of the orders and the order of said known first lines is determined from the diffraction grating parameter of the echelle grating.

25. Method according to claim 19, wherein the fitting function is a polynomial function of second or third order and the wavelength scale is stored in the form of fitting parameters of a secondary fitting function describing corresponding fitting parameters of each order.

* * * * *